United States Patent
McKenney

(10) Patent No.: US 9,389,925 B2
(45) Date of Patent: Jul. 12, 2016

(54) ACHIEVING LOW GRACE PERIOD LATENCIES DESPITE ENERGY EFFICIENCY

(71) Applicant: International Business Machines Corporation, Armonk, NY (US)

(72) Inventor: Paul E. McKenney, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 241 days.

(21) Appl. No.: 14/095,541

(22) Filed: Dec. 3, 2013

(65) Prior Publication Data

US 2015/0153817 A1    Jun. 4, 2015

(51) Int. Cl.
G06F 1/26    (2006.01)
G06F 9/50    (2006.01)
G06F 1/32    (2006.01)

(52) U.S. Cl.
CPC ............ *G06F 9/5094* (2013.01); *G06F 1/3203* (2013.01); *Y02B 60/142* (2013.01)

(58) Field of Classification Search
CPC ...................................................... G06F 1/3293
USPC ........................................................ 713/323
See application file for complete search history.

(56) References Cited

U.S. PATENT DOCUMENTS

| | | | |
|---|---|---|---|
| 5,442,758 A | 8/1995 | Slingwine et al. |
| 5,608,893 A | 3/1997 | Slingwine et al. |
| 5,727,209 A | 3/1998 | Slingwine et al. |
| 6,219,690 B1 | 4/2001 | Slingwine et al. |
| 6,662,184 B1 | 12/2003 | Friedberg |
| 6,886,162 B1 | 4/2005 | McKenney |
| 6,996,812 B2 | 2/2006 | McKenney |
| 7,191,272 B2 | 3/2007 | McKenney |
| 7,287,135 B2 | 10/2007 | McKenney et al. |
| 7,349,926 B2 | 3/2008 | McKenney et al. |
| 7,353,346 B2 | 4/2008 | McKenney et al. |
| 7,395,263 B2 | 7/2008 | McKenney |
| 7,395,383 B2 | 7/2008 | McKenney |
| 7,426,511 B2 | 9/2008 | McKenney |
| 7,454,581 B2 | 11/2008 | McKenney et al. |
| 7,472,228 B2 | 12/2008 | McKenney et al. |
| 7,653,791 B2 | 1/2010 | McKenney |
| 7,668,851 B2 | 2/2010 | Triplett |
| 7,689,789 B2 | 3/2010 | McKenney et al. |
| 7,734,879 B2 | 6/2010 | McKenney et al. |
| 7,734,881 B2 | 6/2010 | McKenney et al. |

(Continued)

OTHER PUBLICATIONS

P. Zijlstra, "[PATCH] slab: document SLAB_DESTROY_BY_RCU", LKML.org, Nov. 13, 2008, 1 page.

(Continued)

*Primary Examiner* — Chun Cao
*Assistant Examiner* — Volvick Derose
(74) *Attorney, Agent, or Firm* — Walter W. Duft

(57) ABSTRACT

A technique for achieving low grace-period latencies in an energy efficient environment in which processors with Read-Copy Update (RCU) callbacks are allowed to enter low power states. In an example embodiment, for each processor that has RCU callbacks, different grace period numbers are assigned to different groups of the processor's RCU callbacks. New grace periods are periodically started and old grace periods are periodically ended. As old grace periods end, groups of RCU callbacks having corresponding assigned grace period numbers are invoked.

20 Claims, 10 Drawing Sheets

(56) References Cited

U.S. PATENT DOCUMENTS

| | | | |
|---|---|---|---|
| 7,747,805 | B2 | 6/2010 | McKenney |
| 7,814,082 | B2 | 10/2010 | McKenney |
| 7,818,306 | B2 | 10/2010 | McKenney et al. |
| 7,873,612 | B2 | 1/2011 | McKenney et al. |
| 7,904,436 | B2 | 3/2011 | McKenney |
| 7,934,062 | B2 | 4/2011 | McKenney et al. |
| 7,953,708 | B2 | 5/2011 | McKenney et al. |
| 7,953,778 | B2 | 5/2011 | McKenney et al. |
| 7,987,166 | B2 | 7/2011 | McKenney et al. |
| 8,020,160 | B2 | 9/2011 | McKenney |
| 8,055,860 | B2 | 11/2011 | McKenney et al. |
| 8,055,918 | B2 | 11/2011 | McKenney et al. |
| 8,108,696 | B2 | 1/2012 | Triplett |
| 8,126,843 | B2 | 2/2012 | McKenney et al. |
| 8,176,489 | B2 | 5/2012 | Bauer et al. |
| 8,185,704 | B2 | 5/2012 | McKenney et al. |
| 8,195,893 | B2 | 6/2012 | Triplett |
| 8,307,173 | B2 | 11/2012 | McKenney |
| 8,407,503 | B2 | 3/2013 | McKenney |
| 8,495,641 | B2 | 7/2013 | McKenney |
| 2005/0240740 | A1* | 10/2005 | Takeda ............... G06F 11/2066 711/162 |
| 2006/0112121 | A1 | 5/2006 | McKenney et al. |
| 2006/0265373 | A1 | 11/2006 | McKenney et al. |
| 2008/0082532 | A1 | 4/2008 | McKenney |
| 2008/0313238 | A1 | 12/2008 | McKenney et al. |
| 2009/0077080 | A1 | 3/2009 | McKenney |
| 2009/0271435 | A1* | 10/2009 | Yako ................ G06F 17/30356 |
| 2009/0320030 | A1 | 12/2009 | Ogasawara |
| 2010/0162019 | A1* | 6/2010 | Kumar ..................... H04N 5/63 713/323 |
| 2011/0283082 | A1 | 11/2011 | McKenney et al. |
| 2012/0047140 | A1 | 2/2012 | McKenney et al. |
| 2012/0144129 | A1 | 6/2012 | McKenney |
| 2012/0210069 | A1* | 8/2012 | Bayer ..................... G06F 13/00 711/122 |
| 2012/0324170 | A1 | 12/2012 | McKenney |
| 2012/0324461 | A1 | 12/2012 | McKenney |
| 2012/0324473 | A1 | 12/2012 | McKenney |
| 2012/0331237 | A1 | 12/2012 | McKenney |
| 2012/0331238 | A1 | 12/2012 | McKenney |
| 2013/0061071 | A1 | 3/2013 | McKenney |
| 2013/0138896 | A1 | 5/2013 | McKenney |
| 2013/0151488 | A1 | 6/2013 | McKenney et al. |
| 2013/0151489 | A1 | 6/2013 | McKenney et al. |
| 2013/0151524 | A1 | 6/2013 | McKenney et al. |
| 2013/0151798 | A1 | 6/2013 | McKenney |
| 2013/0151811 | A1 | 6/2013 | McKenney et al. |
| 2013/0152095 | A1 | 6/2013 | McKenney |
| 2013/0282853 | A1* | 10/2013 | Jun ........................ G06F 9/544 709/213 |
| 2013/0311995 | A1 | 11/2013 | McKenney |
| 2014/0108416 | A1* | 4/2014 | Hornkvist ......... G06F 17/30336 707/741 |
| 2015/0149658 | A1* | 5/2015 | Wei ........................... G06F 8/67 709/242 |

OTHER PUBLICATIONS

A. Arcangeli et al., "Using Read-Copy-Update Techniques for System V IPC in the Linux 2.5 Kernel," 2003 FREENIX, Jun. 14, 2003, 13 pages.

P. McKenney, "The RCU API, 2010 Edition", LWN.net, Dec. 8, 2010, 11 pages.

M. Desnoyers et al., "User-Level Implementations of Read-Copy Update", IEEE Transactions On Parallel And Distributed Systems, vol. x, No. y, Jul. 2009, pp. 1-14.

J. Triplett, "Scalable Concurrent Hash Tables via Relativistic Programming", ACM-SIGOPS Operating System Review vol. 44, Issue 3, Jul. 2010, 14 pages.

T. Gleixner, High Resolution Timers / Dynamic Tics—V2, LWN.net, Oct. 31, 2006, 5 pages.

D. Brodkowski, "Re: A few questions and issues with dynticks, NOHZ and powertop", Apr. 6, 2010, see <http://linux.derkeiler.com/Mailing-Lists/Kernel/2010-04/msg01380.html>, 4 pages.

ip.com et al.; "Avoiding Unnecessary Wakeups When Waking Up CPUs At The Completion Of A Grace Period", IPCOM000216206D, Mar. 25, 2012.

Hornbeck et al., "Power Management In The Linux Kernel", Apr. 7, 2011, pp. 1-31.

McKenney, "Getting RCU Further Out Of The Way", 2012 Linux Plumbers Conference, Real Time Microconference, Aug. 31, 2012, 31 pages.

McKenney, "CPU Hotplug, RCU, and big.LITTLE", Linaro Connect, Nov. 2012, pp. 1-33.

McKenney, "Real-Time Response on Multicore Systems: It Is Bigger Than You Think", OSPERT '12 Workshop, Jul. 10. 2012, pp. 1-34.

McKenney, "Making RCU Safe For Battery-Powered Devices", Embedded Linux Conference, Feb. 15, 2012, pp. 1-66.

McKenney et al., "Improving Energy Efficiency On Asymmetric Multiprocessing Systems", AMPenergy, Mar. 5, 2013, pp. 1-8.

Anonymous, Avoiding unnecessary wakeups when waking up CPUs at the completion of a grace period, IPCOM000216206D, ip.com, Mar. 25, 2012.

P. McKenney, "Exploiting Deferred Destruction: An Analysis of Read-Copy-Update Techniques in Operating System Kernels," OGI School of School of Science & Engineering at Oregon Health & Science University, Jul. 2004, pp. 1-380.

P. McKenney et al., "Extending RCU for Realtime and Embedded Workloads," 2006 Ottawa Linux Symposium, Aug. 11, 2006, 15 pages.

P. McKenney, "The design of preemptible read-copy-update," LWN. net, Oct. 8, 2007, 27 pages.

P. McKenney, "Integrating and Validating dynticks and Preemptible RCU," LWN.net, Apr. 22, 2008, 19 pages.

P. McKenney, "Hierarchical RCU," LWN.net, Nov. 4, 2008, 19 pages.

P. McKenney, "Is Parallel Programming Hard, And, If So, What Can You Do About It", Mar. 8, 2009, 146 pages.

P. McKenney, "Priority-Boosting RCU Read-Side Critical Sections," LWN.net, Feb. 5, 2007, 15 pages.

P. McKenney et al., "Towards hard realtime response from the Linux kernel on SMP hardware," linux.conf.au, Canberra, Australia, Apr. 2005, 16 pages.

P. McKenney et al., "Exploiting Deferred Destruction: An Analysis of Read-Copy-Update Techniques in Operating System Kernels", Jan. 3, 2005, pp. 1-41.

D. Guniguntala et al., "The read-copy-update mechanism for supporting real-time applications on shared memory multiprocessor systems with Linux", IBM Systems Journal vol. 47 No. 2, 2008, pp. 221-236.

P. McKenney, "Introducing Technology Into Linux", 2008 Linux Developer Symposium, China, 2008, 47 pages.

T. Hart et al., "Performance of memory reclamation for lockless synchronization", Journal of Parallel and Distributed Computing, Dec. 2007, pp. 1270-1285.

McKenney, "Using Promela and Spin to verify parallel algorithms", LWN.net, Aug. 1, 2007, 11 pages.

McKenney, "RCU and Unloadable Modules", LWN.net, Jan. 14, 2007, 4 pages.

J. Seigh, "RCU + SMR for preemptive kernel/user threads," Linux Kernel Mailing List, May 9, 2005, 2 pages.

M. Michael, "Hazard Pointers: Safe Memory Reclamation for Lock-Free Objects," IEEE Transactions On Parallel And Distributed Systems, Jul. 2004, vol. 15, No. 6, pp. 491-504.

D. Sarma et al, "Making RCU Safe for Deep Sub-Millisecond Response Realtime Applications," 2004 USENIX (UseLinux track) Jun. 2004, 9 pages.

P. McKenney, "RCU vs. Locking Performance on Different CPUs," 2004 Linux.conf.au, 2004, 18 pages.

P. McKenney et al., "Scaling dcache with RCU," Linux Journal, Jan. 1, 2004, 12 pages.

P. McKenney et al., "Using RCU in the Linux 2.5 Kernel," Linux Journal, Oct. 1, 2003, 11 pages.

P. McKenney et al.,"Read-Copy Update," 2002 Ottawa Linux Symposium, Jul. 8, 2002, 32 pages.

(56) References Cited

OTHER PUBLICATIONS

H. Lindar et al., "Scalability of the Directory Entry Cache," 2002 Ottawa Linux Symposium, Jun. 26, 2002, pp. 289-300.
P. McKenney et al., "Read-Copy Update," 2001 Ottawa Linux symposium, Jul. 2001, 22 pages.
P. McKenney et al., "Read-Copy Update: Using Execution History to Solve Concurrency Problems," PDCS, Oct. 1998, 11 pages.
S. Dietrich et al., "Evolution of Real-Time Linux," 7th RTL Workshop, Nov. 17, 2005, 18 pages.
B. Gamsa, "Tornado: Maximizing Locality and Concurrency in a Shared Memory Multiprocessor Operating System," 1999, 14 pages.
Molnar et al., "Realtime and Linux," 2005 Linux Kernel Summit, 8 pages.
H. Boehm, "The Space Cost of Lazy Reference Counting," ACM SIGPLAN Notices, Proceedings of the 31st ACM SIGPLAN-SIGACT Symposium on Principles of Programming Languages, POPL '04, vol. 39, Issue 1, Jan. 2004, p. 210-219.
M. Michael, "Scalable Lock-Free Dynamic Memory Allocation," ACM SIGPLAN Notices, Proceedings of the ACM SIGPLAN 2004 Conference on Programming Language Design And Implementation; PLDI '04, vol. 39, Issue 6, Jun. 2004, p. 35-46.
D. Dice et al., "Mostly Lock-Free Malloc," ACM SIGPLAN Notices, Proceedings of the 3rd International Symposium on Memory Management, ISMM '02, vol. 38, Issue 2 Supplement, Jun. 2002, p. 163-174.
J. Corbet, "Read-copy-update for realtime," LWN.net, Sep. 26, 2006, 3 pages.
McKenney, "Seven real-time Linux approaches (Part C)", LinuxDevices.com, Jun. 7, 2005, 13 pages.
P. McKenney, "RCU and CONFIG_PREEMPT_RT progress," Linux Kernel Mailing List, May 9, 2005, 2 pages.
O. Nesterov, QRCU: 'Quick' SRCU Implementation, Linux Kernel Mailing List, Dec. 1, 2005, 3 pages.
P. McKenney, "Sleepable RCU", LWN.net, Sep. 6, 2010, 10 pages.
P. McKenney, "Read-Copy Update Implementations", 2001, 3 pages.
M. Herlihy, "A Methodology for Implementing Highly Concurrent Data Objects," ACM Transactions on Programming Languages and Systems, vol. 15, Issue 5, Nov. 1993, pp. 745-770.
M. Michael, "Safe Memory Reclamation for Dynamic Lock-Free Objects Using Atomic Reads and Writes," Proceedings of the 21st Annual ACM Symposium on Principles of Distributed Computing, Jul. 2002, 10 pages.
N. Barghouti et al., "Concurrency Control in Advanced Database Operations," Jan. 1994, 83 pages.
P. McKenney, "Simplicity Through Optimization", linux.conf.au, Jan. 2010, 109 pages.
P. McKenney, "Deterministic Synchronization in Multicore Systems: the Role of RCU", Aug. 18, 2009, pp. 1-9.
P. McKenney, "RCU cleanups and simplified preemptable RCU", LKML.org, Jul. 23, 2009, 1 page.
P. McKenney, "Expedited "big hammer" RCU grace periods", LKML.org, Jun. 25, 2009, 2 pages.
P. McKenney, "RCU: The Bloatwatch Edition", LWN.net, Mar. 17, 2009, 9 pages.
M. Desnoyers, "Low-Impact Operating System Tracing", University of Montreal, PhD Thesis, Dec. 2009, 233 pages.
P. McKenney, "Using a Malicious User-Level RCU to Torture RCU-Based Algorithms", linux.conf.au, Jan. 2009, 51 pages.
P. McKenney et al., "Introducing Technology Into the Linux Kernel: A Case Study", Operating Systems Review, Jul. 2008, 16 pages.
P. McKenney, "What is RCU, Fundamentally", LWN.net, Dec. 17, 2007, 15 pages.
P. McKenney, What is RCU? Part 2: Usage, LWN.net, Dec. 24, 2007, 15 pages.
P. McKenney, RCU part 3: the RCU API, LWN.net, Jan. 7, 2008, 7 pages.

\* cited by examiner

ACHIEVING LOW GRACE PERIOD LATENCIES DESPITE ENERGY EFFICIENCY

BACKGROUND

1. Field

The present disclosure relates to computer systems and methods in which data resources are shared among data consumers while preserving data integrity and consistency relative to each consumer. More particularly, the disclosure concerns a mutual exclusion mechanism known as "read-copy update."

2. Description of the Prior Art

By way of background, read-copy update (also known as "RCU") is a mutual exclusion technique that permits shared data to be accessed for reading without the use of locks, writes to shared memory, memory barriers, atomic instructions, or other computationally expensive synchronization mechanisms, while still permitting the data to be updated (modify, delete, insert, etc.) concurrently. The technique is well suited to both uniprocessor and multiprocessor computing environments wherein the number of read operations (readers) accessing a shared data set is large in comparison to the number of update operations (updaters), and wherein the overhead cost of employing other mutual exclusion techniques (such as locks) for each read operation would be high. By way of example, a network routing table that is updated at most once every few minutes but searched many thousands of times per second is a case where read-side lock acquisition would be quite burdensome.

The read-copy update technique implements data updates in two phases. In the first (initial update) phase, the actual data update is carried out in a manner that temporarily preserves two views of the data being updated. One view is the old (pre-update) data state that is maintained for the benefit of read operations that may have been referencing the data concurrently with the update. The other view is the new (post-update) data state that is seen by operations that access the data following the update. In the second (deferred update) phase, the old data state is removed following a "grace period" that is long enough to ensure that the first group of read operations will no longer maintain references to the pre-update data. The second-phase update operation typically comprises freeing a stale data element to reclaim its memory. In certain RCU implementations, the second-phase update operation may comprise something else, such as changing an operational state according to the first-phase update.

FIGS. 1A-1D illustrate the use of read-copy update to modify a data element B in a group of data elements A, B and C. The data elements A, B, and C are arranged in a singly-linked list that is traversed in acyclic fashion, with each element containing a pointer to a next element in the list (or a NULL pointer for the last element) in addition to storing some item of data. A global pointer (not shown) is assumed to point to data element A, the first member of the list. Persons skilled in the art will appreciate that the data elements A, B and C can be implemented using any of a variety of conventional programming constructs, including but not limited to, data structures defined by C-language "struct" variables. Moreover, the list itself is a type of data structure.

It is assumed that the data element list of FIGS. 1A-1D is traversed (without locking) by multiple readers and occasionally updated by updaters that delete, insert or modify data elements in the list. In FIG. 1A, the data element B is being referenced by a reader r1, as shown by the vertical arrow below the data element. In FIG. 1B, an updater u1 wishes to update the linked list by modifying data element B. Instead of simply updating this data element without regard to the fact that r1 is referencing it (which might crash r1), u1 preserves B while generating an updated version thereof (shown in FIG. 1C as data element B') and inserting it into the linked list. This is done by u1 acquiring an appropriate lock (to exclude other updaters), allocating new memory for B', copying the contents of B to B', modifying B' as needed, updating the pointer from A to B so that it points to B', and releasing the lock. In current versions of the Linux® kernel, pointer updates performed by updaters can be implemented using the rcu_assign_pointer( ) primitive. As an alternative to locking during the update operation, other techniques such as non-blocking synchronization or a designated update thread could be used to serialize data updates. All subsequent (post update) readers that traverse the linked list, such as the reader r2, will see the effect of the update operation by encountering B' as they dereference B's pointer. On the other hand, the old reader r1 will be unaffected because the original version of B and its pointer to C are retained. Although r1 will now be reading stale data, there are many cases where this can be tolerated, such as when data elements track the state of components external to the computer system (e.g., network connectivity) and must tolerate old data because of communication delays. In current versions of the Linux® kernel, pointer dereferences performed by readers can be implemented using the rcu_dereference( ) primitive.

At some subsequent time following the update, r1 will have continued its traversal of the linked list and moved its reference off of B. In addition, there will be a time at which no other reader process is entitled to access B. It is at this point, representing an expiration of the grace period referred to above, that u1 can free B, as shown in FIG. 1D.

FIGS. 2A-2C illustrate the use of read-copy update to delete a data element B in a singly-linked list of data elements A, B and C. As shown in FIG. 2A, a reader r1 is assumed be currently referencing B and an updater u1 wishes to delete B. As shown in FIG. 2B, the updater u1 updates the pointer from A to B so that A now points to C. In this way, r1 is not disturbed but a subsequent reader r2 sees the effect of the deletion. As shown in FIG. 2C, r1 will subsequently move its reference off of B, allowing B to be freed following the expiration of a grace period.

In the context of the read-copy update mechanism, a grace period represents the point at which all running tasks (e.g., processes, threads or other work) having access to a data element guarded by read-copy update have passed through a "quiescent state" in which they can no longer maintain references to the data element, assert locks thereon, or make any assumptions about data element state. By convention, for operating system kernel code paths, a context switch, an idle loop, and user mode execution all represent quiescent states for any given CPU running non-preemptible code (as can other operations that will not be listed here). The reason for this is that a non-preemptible kernel will always complete a particular operation (e.g., servicing a system call while running in process context) prior to a context switch.

In FIG. 3, four tasks 0, 1, 2, and 3 running on four separate CPUs are shown to pass periodically through quiescent states (represented by the double vertical bars). The grace period (shown by the dotted vertical lines) encompasses the time frame in which all four tasks that began before the start of the grace period have passed through one quiescent state. If the four tasks 0, 1, 2, and 3 were reader tasks traversing the linked lists of FIGS. 1A-1D or FIGS. 2A-2C, none of these tasks having reference to the old data element B prior to the grace period could maintain a reference thereto following the grace period. All post grace period searches conducted by these tasks would bypass B by following the updated pointers created by the updater.

Grace periods may be synchronous or asynchronous. According to the synchronous technique, an updater performs the first phase update operation, then blocks (waits) until a grace period has completed, and a second phase update operation, such as removing stale data, is performed. According to the asynchronous technique, an updater performs the first phase update operation, specifies the second phase update operation as a callback, then resumes other processing with the knowledge that the callback will eventually be processed at the end of a grace period. Advantageously, callbacks requested by one or more updaters can be batched (e.g., on a multi-part callback lists) and processed as a group at the end of an asynchronous grace period. This allows asynchronous grace period overhead to be amortized over plural deferred update operations. An RCU state machine mechanism is used to start and end grace periods and advance the RCU callbacks, one grace period at a time, through several stages of callback list processing. A typical RCU callback list may comprise three or four sublist portions that segregate the batched RCU callbacks into callback groups that are processed at the end of different grace periods. A callback must advance through each sublist before it is ready for invocation. In RCU implementations used in the Linux® kernel, there is typically one RCU callback list per processor, and list tail pointers are used to divide each callback list into four sublists. The callback sublists are named for their corresponding tail pointers. Newly arrived callbacks that must await a subsequent grace period before they can be invoked are placed on a first sublist named "RCU_NEXT_TAIL." As grace periods elapse, the callbacks first advance to a second sublist named "RCU_NEXT_READY_TAIL," then to a third sublist named "RCU_WAIT_TAIL," and finally arrive at a sublist named "RCU_DONE_TAIL." All callbacks on the RCU_DONE_TAIL sublist are deemed to be ready for invocation.

More recently, RCU grace period processing has been adapted to account for processor low power states (such as, on Intel® processors, the C1E halt state, or the C2 or deeper halt states). Operating systems can take advantage of low power state capabilities by using mechanisms that withhold regular timer interrupts from processors (in a low power state) unless the processors need to wake up to perform work. The dynamic tick framework (also called "dyntick" or "nohz") in existing versions of the Linux® kernel is one such mechanism. In RCU implementations designed for low power applications in the Linux® kernel, a compiler configuration option called RCU_FAST_NO_HZ is available. This option allows processors to be placed in low power states even if there are pending RCU callbacks, provided none require immediate invocation and the processor is not needed for grace period advancement processing. Such processors will awaken after a short interval (e.g., four scheduling clock periods), at which time the processor will attempt to advance its RCU callbacks. This capability results in significant power savings for some workloads.

Unfortunately, the RCU_FAST_NO_HZ option can also result in greatly increased grace period latencies. This is due to the fact that the processors which are sleeping with callbacks cannot take full advantage of subsequent grace periods. A waking processor reacts only to a change in a tracked grace period completion number. It does not account for the actual number of additional grace periods that have elapsed. So even if several grace periods elapse while the processor was sleeping, the processor will take advantage of only one, thus potentially delaying its callbacks for another sleep period. On a busy system, a callback will normally take roughly 1.5 grace periods to advance through the callback sublists. After arriving on the RCU_NEXT_TAIL sublist, the callback will advance to the RCU_NEXT_READY_TAIL sublist and as soon as the callback becomes known to the RCU subsystem. When the next grace period starts, the callback advances to the RCU_WAIT_TAIL sublist. When that grace period ends, the callback advances to the RCU_DONE_TAIL sublist for invocation. In the case of a sleeping processor, if the processor goes idle before the callback advances to the WAIT sublist, an additional 0.5 grace periods will be required to advance the callback when the processor wakes up. This is because the processor does not receive credit for more than one of the potentially many grace periods that elapsed while it was idle. As a consequence, the scheduling clock tick is typically not deactivated for processors that have callbacks.

Another scenario causing increased grace period latency for a sleeping processor (in a RCU_FAST_NO_HZ kernel) is when no other processor in the system needs a grace period to start. In that case, the start of the next grace period will be delayed until the sleeping processor awakens, further degrading grace period latency for another sleep period. Because no other processor sees any reason to start a new grace period, the RCU subsystem remains idle while the processor is asleep. When the processor wakes up, an additional grace period is required to advance its callbacks. Had the RCU subsystem been aware of the processor's need for an additional grace period while the processor slept, the processor could have instead woken up to find that the grace period that it needed had already completed. Because of this latency issue, the RCU_FAST_NO_HZ option causes processors that are sleeping with callbacks to attempt several times to advance the RCU state machine on the off-chance that some of the callbacks can then be invoked. This state machine work often has no effect and consumes processor time, and thus energy.

Accordingly, there is a need for a technique that allows processors to sleep with RCU callbacks without needing to expend large amounts of processor time on idle entry, while taking full advantage of any grace periods that elapse during the sleep interval, and by initiating grace periods as needed during the sleep interval without having to awaken to do so.

SUMMARY

A method, system and computer program product are provided to achieve low grace-period latencies in an energy efficient environment in which processors with Read-Copy Update (RCU) callbacks are allowed to enter low power states. In an example embodiment, for each processor that has RCU callbacks, different grace period numbers are assigned to different groups of the processor's RCU callbacks. New grace periods are periodically started and old grace periods are periodically ended. As old grace periods end, groups of RCU callbacks having corresponding assigned grace period numbers are invoked.

In an example embodiment, groups of RCU callbacks are maintained on sublists of RCU callback lists associated with the one or more processors. Grace period number assigning may then comprise a callback accelerate operation wherein grace period numbers are assigned to newly arrived groups of RCU callbacks, and wherein the newly arrived groups of RCU callbacks are placed on selected sublists according to the assigned grace period numbers.

In an example embodiment, the RCU callback lists include a done-sublist for RCU callbacks that are ready to be invoked. A callback advance operation may then be performed for each of the one or more processors that is not offline or designated as a no-callbacks processor, and which has RCU callbacks that are waiting for a not-yet-completed grace period. The callback advance operation may include advancing to the done-sublist any groups of RCU callbacks whose assigned grace period numbers correspond to grace periods that have ended. The callback advance operation may further include performing the callback accelerate operation.

In an example embodiment, the RCU callback lists each comprise plural sublists, and the callback advance operation further includes adjusting sublists other than the done-sublist to maintain the RCU callback lists in a consistent state without holes therein.

In an example embodiment, the callback advance operation is attempted as the one or more processors prepare for entry into a low power state, the callback accelerate operation is attempted on entry into the low power state, and the callback advance operation is attempted again on exit from the low power state.

In an example embodiment, the assigning of grace period numbers includes recording future grace periods needed by the one or more processors so that the grace periods can be initiated without waking the one or more processors if they are in a low power state.

In an example embodiment, the disclosed operations further include using the future grace period recording to offload callback invocation from specially designated ones of the one or more processors.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Introduction

The present disclosure provides a technique that achieves low RCU grace period latency in an energy efficient environment in which processors with RCU callbacks are allowed to enter low power states. One example of such an environment would be an RCU implementation designed for low power applications in the Linux® kernel compiled using the RCU_FAST_NO_HZ configuration option. Embodiments of the disclosed technique achieve the desired goal by implementing one or more of the following concepts:

1. Numbering groups of RCU callbacks to allow processors to take advantage of multiple past grace periods, with different grace period numbers being assigned to different groups of the processor's RCU callbacks. New grace periods are periodically started and old grace periods are periodically ended. As old grace periods end, groups of RCU callbacks having corresponding assigned grace period numbers are invoked;

2. Proactively numbering groups of RCU callbacks, particularly newly arrived callbacks, on a given processor at idle-entry/exit time to minimize grace-period latency, thus eliminating the need to run through the RCU state machine in power-optimized kernels, such as a Linux® CONFIG_RCU_FAST_NO_HZ kernel;

3. Recording the need for future grace periods so that the number of additional grace periods a processor requires may be determined and so that these grace periods will not be delayed due to a processor being asleep in dyntick-idle mode at the time the preceding grace period ends, thereby allowing a given processor's callback's grace periods to be initiated and completed without having to awaken that idle processor, and promoting energy efficiency for processors that have callbacks by allowing them to enter deep sleep states without substantially degrading grace period latencies; and 4. Using the future grace period recording to allow kernel threads to offload callback invocation from specially designated no-callback processors.

Example Embodiments

Figure 1A:
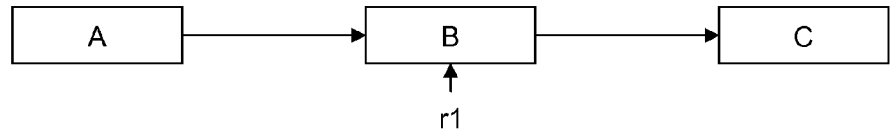
FIGS. 1A-1D are diagrammatic representations of a linked list of data elements undergoing a data element replacement according to a conventional read-copy update mechanism.
Figure 1B:
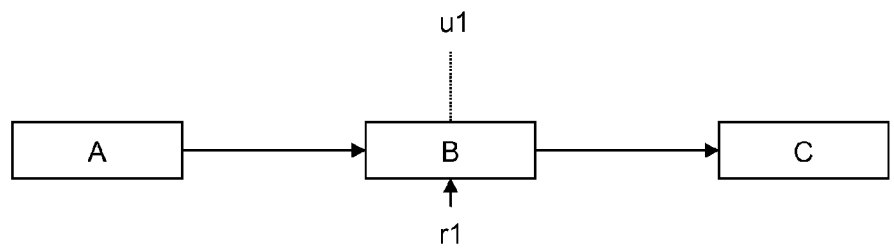
Figure 1C:
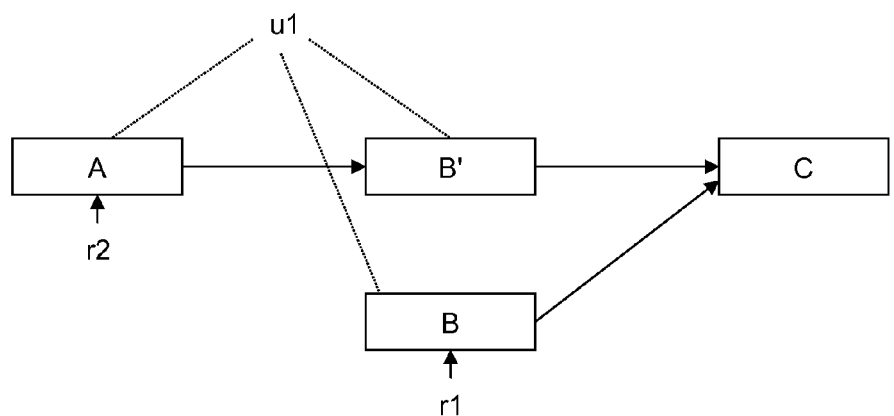
Figure 1D:
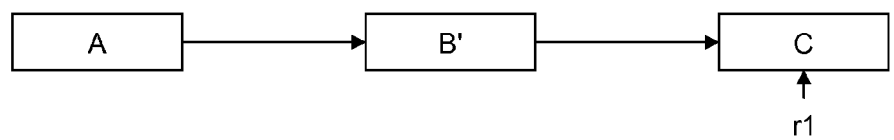
Figure 2A:
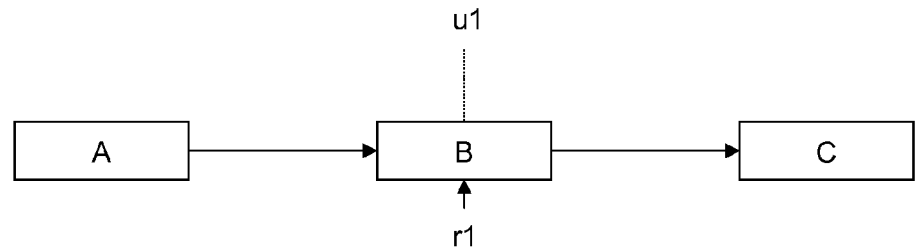
FIGS. 2A-2C are diagrammatic representations of a linked list of data elements undergoing a data element deletion according to a conventional read-copy update mechanism.
Figure 2B:
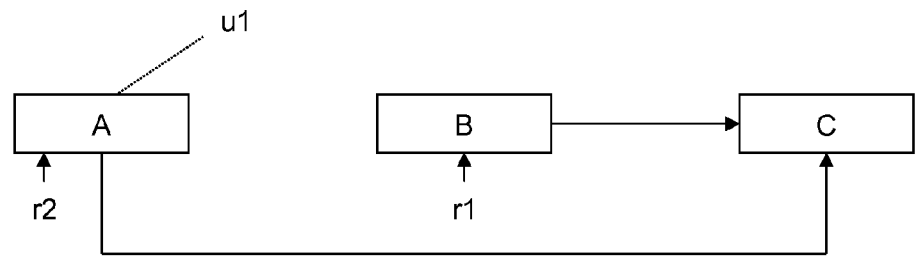
Figure 2C:
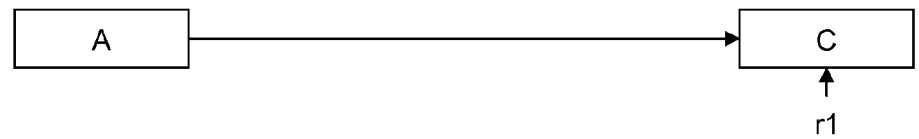
Figure 3:
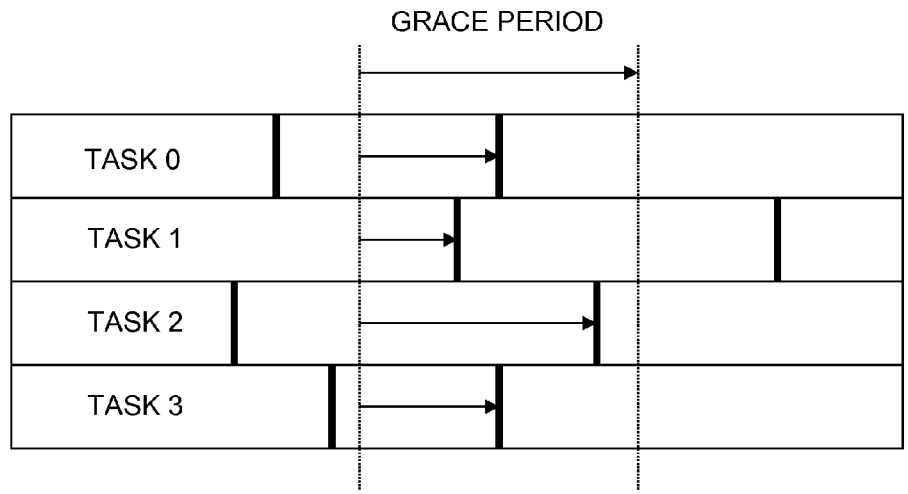
FIG. 3 is a flow diagram illustrating a grace period in which four processes pass through a quiescent state.
Figure 4:
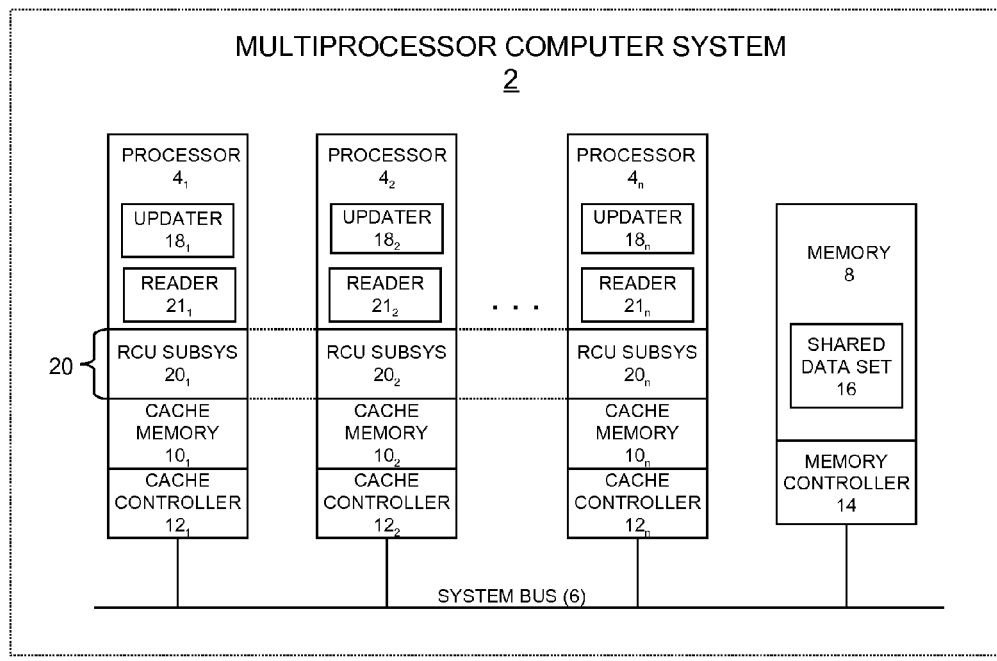
FIG. 4 is a functional block diagram showing a multiprocessor computing system.

Turning now to the figures, wherein like reference numerals represent like elements in all of the several views, FIG. 4 illustrates an example multiprocessor computer system in which the grace period processing technique described herein may be implemented. In FIG. 4, a computer system 2 includes multiple processors $4_1, 4_2 \ldots 4_n$, a system bus 6, and a program memory 8. There are also cache memories $10_1$, $10_2 \ldots 10_n$ and cache controllers $12_1, 12_2 \ldots 12_n$ respectively associated with the processors $4_1, 4_2 \ldots 4_n$. A conventional memory controller 14 is associated with the memory 8. As shown, the memory controller 14 may reside separately from processors $4_2 \ldots 4_n$ (e.g., as part of a chipset). As discussed below, it could also comprise plural memory controller instances residing on the processors $4_1, 4_2 \ldots 4_n$.

The computer system 2 may represent any of several different types of computing apparatus. Such computing apparatus may include, but are not limited to, general purpose computers, special purpose computers, portable computing devices, communication and/or media player devices, set-top devices, embedded systems, and other types of information handling machines. The term "processor" as used with reference to the processors $4_1, 4_2 \ldots 4_n$ encompasses any program execution unit capable of executing program instructions, including but not limited to a packaged integrated circuit device (such as a microprocessor), a processing core within a packaged integrated circuit device (such as a microprocessor core), or a hardware thread comprising one or more functional units within a processing core (such as an SMT thread). Each such execution unit may also be referred to as a CPU (central processing unit). The processors $4_1, 4_2 \ldots 4_n$ may be situated within a single computing device or node (e.g., as part of a single-node SMP system) or they may be distributed over plural nodes (e.g., as part of a NUMA system, a cluster, or a cloud). The memory 8 may comprise any type of tangible storage medium capable of storing data in computer readable form for use in program execution, including but not limited to, any of various types of random access memory (RAM), various flavors of programmable read-only memory (PROM) (such as flash memory), and other types of primary storage (i.e., program memory). The cache memories $10_1, 10_2 \ldots 10_n$ may be implemented in several levels (e.g., as level 1, level 2 and level 3 caches) and the cache controllers $12_1, 12_2 \ldots 12_n$ may collectively represent the cache controller logic that supports each cache level. As illustrated, the memory controller 14 may reside separately from processors $4_1, 4_2 \ldots 4_n$, for example, as part of a discrete chipset. Alternatively, as previously mentioned, the memory controller 14 could be provided by plural memory controller instances that are respectively integrated with the processors $4_1, 4_2 \ldots 4_n$.

Each CPU embodied by a given processor 4 is operable to execute program instruction logic under the control of a software program stored in the memory 8 (or elsewhere). As part of this program execution logic, update operations (updaters) 18 may execute within a process, thread, or other execution context (hereinafter "task") on any of the processors 4. Each updater 18 runs periodically to perform updates on a set of shared data 16 that may be stored in the shared memory 8 (or elsewhere). In FIG. 4, reference numerals $18_1, 18_2 \ldots 18_n$ illustrate individual data updaters that respectively execute on the several processors $4_1, 4_2 \ldots 4_n$. As described in the "Background" section above, the updates performed by an RCU updater can include modifying elements of a linked list, inserting new elements into the list, deleting elements from the list, and other types of operations. To facilitate such updates, the processors 4 may be programmed from instructions stored in the memory 8 (or elsewhere) to implement a read-copy update (RCU) subsystem 20 as part of their processor functions. In FIG. 4, reference numbers $20_1, 20_2 \ldots 20_n$ represent individual RCU instances that may periodically execute on the several processors $4_1, 4_2 \ldots 4_n$. Any given processor 4 may also execute a read operation (reader) 21. Each reader 21 runs from program instructions stored in the memory 8 (or elsewhere) in order to periodically perform read operations on the set of shared data 16 stored in the shared memory 8 (or elsewhere). In FIG. 4, reference numerals $21_1, 21_2 \ldots 21_n$ illustrate individual reader instances that may respectively execute on the several processors $4_1, 4_2 \ldots 4_n$. Such read operations will typically be performed far more often than updates, this being one of the premises underlying the use of read-copy update. Moreover, it is possible for several of the readers 21 to maintain simultaneous references to one of the shared data elements 16 while an updater 18 updates the same data element.

During operation of the computer system 2, an updater 18 will occasionally perform an update to one of the shared data elements 16. In accordance with the philosophy of RCU, a first-phase update may be performed in a manner that temporarily preserves a pre-update view of the shared data element for the benefit of readers 21 that may be concurrently referencing the shared data element during the update operation. Following the first-phase update, the updater 18 may register a callback with the RCU subsystem 20 for the deferred destruction of the pre-update view (second-phase update) following a grace period. As described in the "Background" section above, this is known as asynchronous grace period processing. Alternatively, the updater 18 may request a synchronous expedited grace period.

The grace period processing performed by the RCU subsystem 20 entails starting new grace periods and detecting the end of old grace periods so that the RCU subsystem 20 knows when it is safe to free stale data (or take other actions). Grace period processing may further entail the management of callback lists that accumulate callbacks until they are ripe for batch processing at the end of a given grace period.

Figure 5:
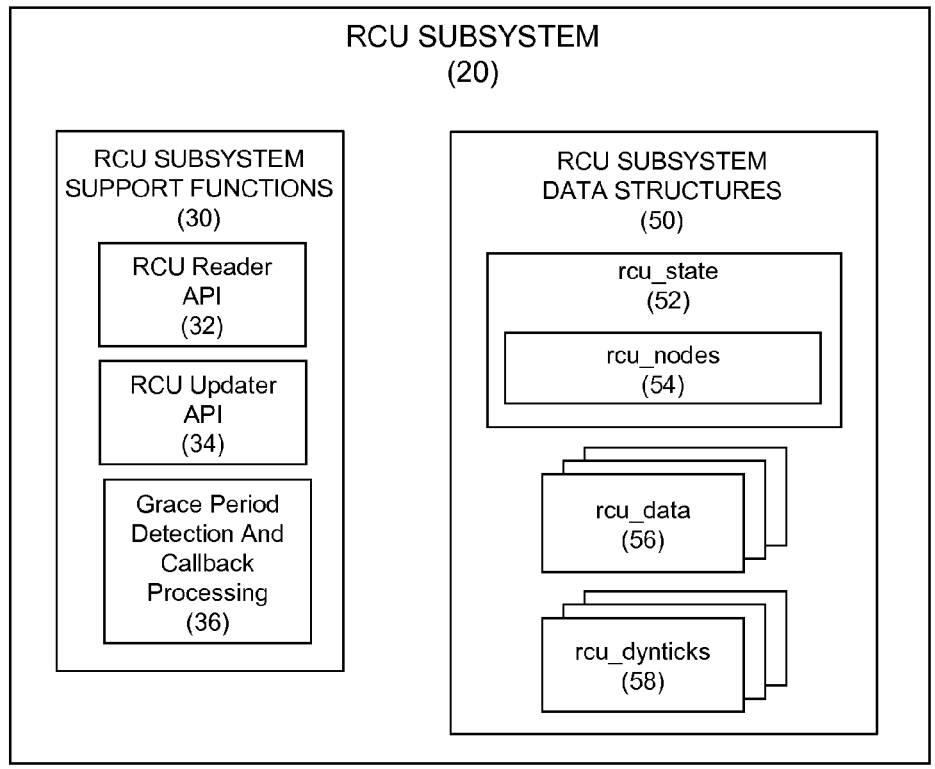
FIG. 5 is a functional block diagram showing an example RCU subsystem that may be provided in the computer system of FIG. 4.

Turning now to FIG. 5, example components of the RCU subsystem 20 are shown. Among these components is a set of RCU subsystem support functions 30, namely, an RCU reader API (Application Programming Interface) 32, an RCU updater API 34, and a set of grace period detection and callback functions 36.

Figure 6:
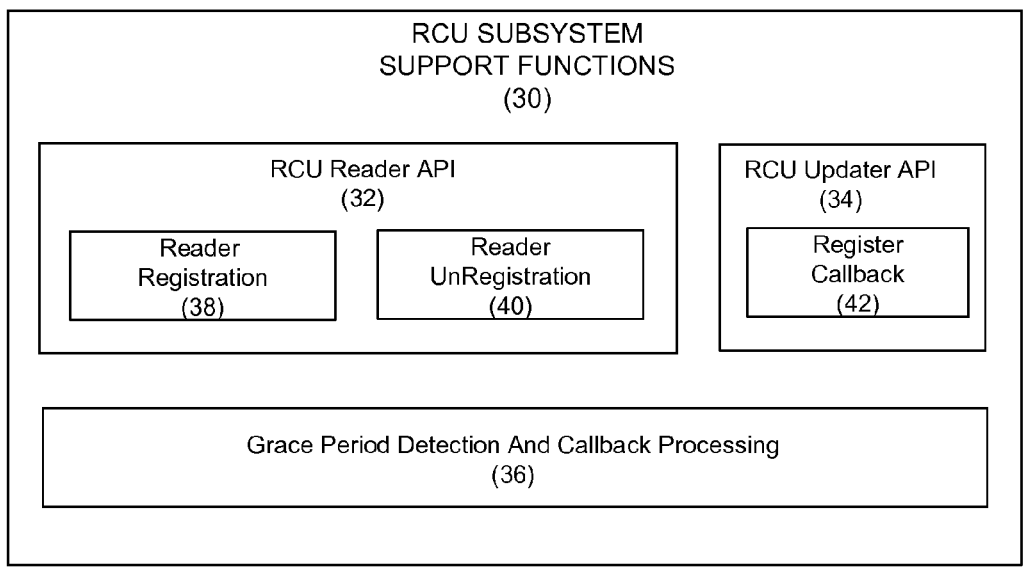
FIG. 6 is a functional block diagram showing example RCU subsystem support functions.

As shown in FIG. 6, the RCU reader API 32 comprises a reader registration component 38 and a reader unregistration component 40. These components are respectively invoked by readers 21 as they enter and leave their RCU read-side critical sections. This allows the RCU subsystem 20 to track reader operations and determine when readers are engaged in RCU-protected read-side critical section processing. In an example embodiment, the reader registration component 38 and the reader unregistration component 40 may be respectively implemented using the rcu_read_lock( ) and rcu_read_unlock( ) primitives found in existing read-copy update implementations.

As also shown in FIG. 6, the RCU updater API 34 comprises a register callback component 42. The register callback component 42 is used by updaters 18 to register a callback following a first-phase update to a shared data element 16. An invocation of the register callback component 42 initiates processing that places the callback on an RCU callback list (described in more detail below) associated with the processor 4 that runs the updater 18. This may start an asynchronous grace period (if one is not already underway) so that the callback can be subsequently processed as part of second-phase update processing to remove stale data (or perform other actions). In an example embodiment, the register callback component 42 may be implemented using the existing call_rcu( ) primitive found in conventional read-copy update implementations.

With continuing reference to FIG. 6, the grace period detection and callback processing component 36 of the RCU subsystem 20 includes various functions that participate in implementing the low grace period latency-energy efficient technique disclosed herein. The operational details of these functions are described in more detail below. The grace period detection and callback processing component 36 also includes a number of other conventional RCU components that are responsible for various operations, such as starting new grace periods, detecting the end of old grace periods, and processing callbacks as grace periods end. A discussion of such components is omitted for ease of description and in order to focus attention on the low grace period latency-energy efficient technique disclosed herein.

Figure 7:
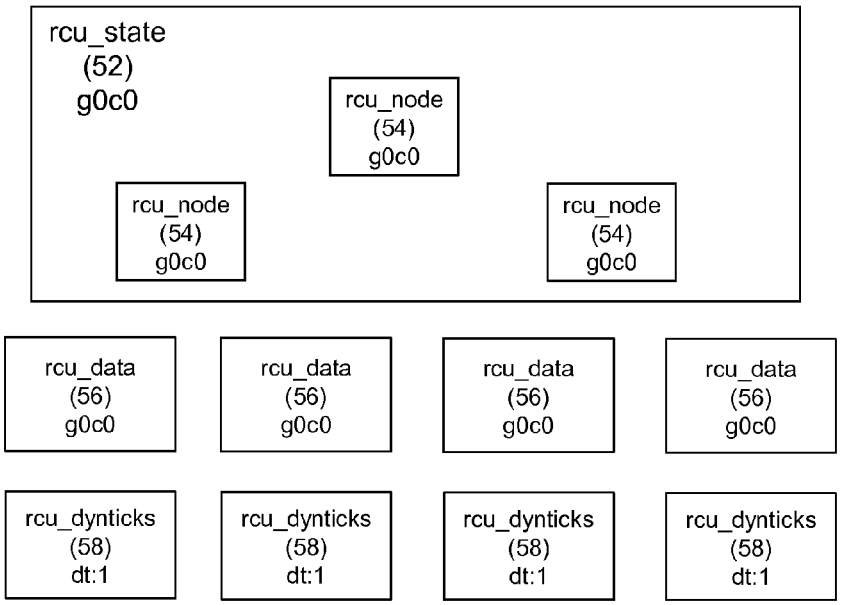
FIG. 7 is a functional block diagram showing example RCU subsystem data structures.

With continuing reference now to FIG. 5, the RCU substyem 20 further includes a set of RCU subsystem data structures 50. For purposes of the present discussion, an example embodiment is presented in which the RCU subsystem 20 is configured as a hierarchical RCU implementation, as is conventionally provided in large multiprocessor computer systems running the Linux® kernel. *See P. McKenney, Hierarchical RCU, lwn.net/Articles/*305782>, Nov. 4, 2008. The RCU subsystem data structures 50 may thus include an rcu_state data structure 52 comprising a set of rcu_node data structures 54 embedded as a linear array within the rcu_state structure. The RCU subsystem data structures 50 may also include a set of a per-processor rcu_data structures 56 and a set of per-processor rcu_dynticks data structures 58. The purpose of these data structures is described in more detail below. If the present embodiment implements several RCU "flavors" (e.g., RCU-bh, RCU-preempt, and RCU-bh), each flavor would have one rcu_state structure 52 and a set of rcu_node structures 55. Each processor 4 would have one rcu_data structure 56 for each flavor. There are typically enough rcu_node structures 54 per RCU flavor to form a combining tree whose leaves are the rcu_data structures 56, and whose internal nodes and root are the rcu_node structures. FIG. 7 presents a simplified view of this hierarchy in which some number of rcu_data structures 56 would report to one of the leaf rcu_node structures 54, and wherein the leaf rcu-node structures 54 would report to higher level rcu_node structures (not explicitly shown) until the root rcu_node structure is reached. Returning now to FIG. 5, it should be noted that a production read-copy update implementation will typically include many additional data structures that are not shown in this Figure. A discussion of such data structures is omitted for ease of description and in order to focus attention on the low grace period latency-energy efficient RCU technique disclosed herein.

1. Numbering Callback Groups

As stated by way of introduction above, the disclosed technique contemplates numbering of groups of RCU callbacks to allow processors to take advantage of multiple past grace periods. Different grace period numbers are assigned to different groups of the processor's RCU callbacks. This section describes various example functions that may be used to implement this functionality.

Figure 8:
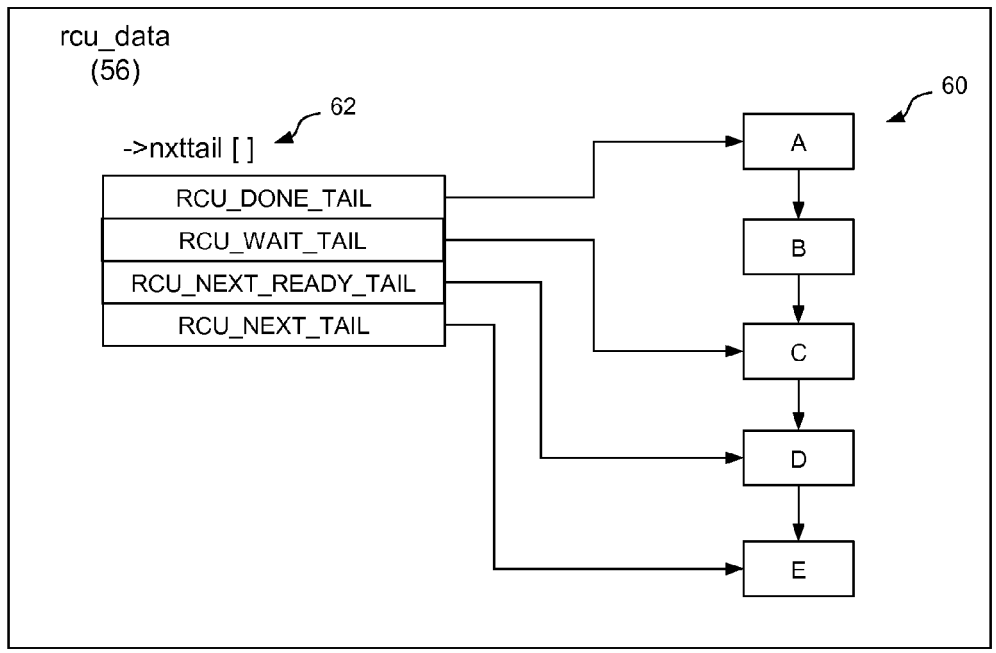
FIG. 8 is a functional block diagram showing components of an example rcu_data structure, including an RCU callback list and a ->nxttail array[ ] comprising list tail pointers defining sublist portions of the RCU callback list.

As is conventional, the RCU subsystem 20 enqueues RCU callbacks on a per-processor basis, with each processor 4 having an associated multi-tailed RCU callback list stored in an associated one of the rcu_data structures 56. An example RCU callback list 60 is shown in FIG. 8. A list pointer array 62, which may be named "nxttail[ ]" in the rcu_data structure 56, contains a pointer in each array element that references the tail of one of four sublist portions of the RCU callback list 60. As discussed in the Background section above, callback sublists are typically named after the array element that references the sublist's tail. Thus, in the RCU callback list 60, there is an RCU_DONE_TAIL sublist, an RCU_WAIT_TAIL sublist, an RCU_NEXT_READY_TAIL sublist, and an RCU_NEXT_TAIL sublist. In FIG. 8, callback A in the RCU_DONE_TAIL sublist is ready to invoke. Callbacks B and C in the RCU_WAIT_TAIL sublist are waiting for the current grace period (or, more accurately, for what the current processor believes to be the current grace period). Callback D in the RCU_NEXT_READY_TAIL sublist is waiting for some later grace period. Callback E in the RCU_NEXT_TAIL sublist is just waiting.

In the Background section above, it was noted that it takes roughly 1.5 grace periods for callbacks on an RCU callback list to advance to the RCU_DONE_TAIL sublist. As will now be explained, this is a generalized case, and the callback residency time may actually be shorter or longer than 1.5 grace periods. In some cases, the transition of a callback from the RCU_NEXT_TAIL sublist to the RCU_NEXT_READY_TAIL sublist can happen quite quickly. For example, a callback can be advanced immediately if its processor knows that the next grace period cannot yet have started. This would occur if the processor has not yet informed the RCU subsystem 20 of a quiescent state for the current grace period. The processor would also know that the next grace period has not started if it is the processor that is responsible for starting that grace period. A callback's transition from the RCU_NEXT_READY_TAIL sublist to the RCU_WAIT_TAIL sublist happens when the processor becomes aware that the next grace period has started, which would on average be 0.5 grace periods. It takes a full grace period for a callback to transition from RCU_WAIT_TAIL sublist to the RCU_DONE_TAIL sublist. Once the callback is on the RCU_DONE_TAIL sublist, invocation could happen quite quickly. So typically, a callback's residency time on the RCU callback list 60 could actually be slightly more than 1.5 grace periods, as little as one grace period, but possibly several grace periods if timing does not work out right. An example of a slow transition scenario would be where a given processor passes through its quiescent state very early in a grace period, and then receives a callback. The processor cannot move the callback from the RCU_NEXT_TAIL sublist to the RCU_NEXT_READY_TAIL sublist because the grace period could end at any time if the processor does not have the means to stop it. So almost a full grace period elapses before this transition can happen. Then another grace period elapses before the transition from RCU_NEXT_READY_TAIL to RCU_WAIT_TAIL, and yet another before RCU_WAIT_TAIL to RCU_DONE_TAIL. That is almost three full grace periods, plus however long is required for the processor to become aware of the grace period endings.

The above-described callback list approach, which is conventionally used in prior art RCU implementations, was designed for situations in which a processor is aware of the start and end of each and every grace period. Before the advent of the RCU_FAST_NO_HZ Linux® kernel configuration option, this was the case for all processors that had at least one RCU callback queued. The conventional callback list approach works well for those cases. In particular, the use of an RCU_NEXT_READY_TAIL sublist (in addition to the RCU_WAIT_TAIL and RCU_DONE_TAIL lists), requires callbacks to wait at least one grace period before being invoked. This allows all processors to invoke callbacks at the ends of consecutive grace periods (provided each processor has a constant influx of callbacks). However, this approach does not handle the case where the processor does not see all of the grace-period transitions, as can occur in RCU_FAST_NO_HZ implementations.

Assigning grace-period numbers to callbacks must be done carefully in hierarchical RCU implementations insofar as global synchronization is avoided. In particular, hierarchical RCU uses the combining tree structure shown in FIG. 7. Within each of the rcu_state, rcu_node, and rcu_data structures 52, 54 and 56, there is a ->gpnum field recording the number of the last grace period to start (indicated by the number following the "g" in FIG. 7) and a ->completed field recording the number of the last grace period to complete (indicated by the number following the "c" in the figure). If all of the ->gpnum and ->completed fields have the same value, then the RCU subsystem 20 is idle. Otherwise, the ->gpnum fields are one greater than the ->completed fields, so that the ->gpnum fields record the number of the current grace period, while the ->completed fields record the number of the previous grace period.

Each rcu_node structure 54 (including its ->gpnum and ->completed fields) is protected by a ->lock field contained within that rcu_node structure, and the ->gpnum and ->completed fields in the rcu_state structure 52 are protected by a ->lock field in the root rcu_node structure 54. The ->gpnum and ->completed fields in the rcu_data structures 56 are not protected by any lock, but can only be accessed and modified by a corresponding one of the processors 4. These fields in the rcu_data structures 56 are thus unsynchronized, and can in fact fall far behind the values in the rcu_node and rcu_state structures 54 and 52 when the corresponding processor 4 is in dyntick-idle mode (and thus not performing any RCU updates). This is acceptable because the rcu_data structure ->gpnum and ->completed fields are used as "snapshots" of those in the corresponding leaf rcu_node structure 54. Their only purpose is to allow the associated processor 4 to detect when grace periods start and end.

In view of the foregoing, when grace period numbers are assigned to callbacks, they must be assigned in accordance with the ->gpnum and ->completed fields of one of the rcu_node structures 54 or the rcu_state structure 52, and the corresponding ->lock must be held. To do otherwise (i.e., to use the ->gpnum and ->completed fields of an rcu_data structure 56) risks premature callback invocation, which would defeat the purpose of RCU. But at the same time, grace period number assignment must not acquire the ->lock fields too often, or the result will be poor performance and limited scalability.

Periodically, a processor 4 will invoke the grace period detection and callback processing component 36 to check the ->completed field in its rcu_data structure 56 against the ->completed field of the leaf rcu_node structure 54 to which it reports. One example is at the end of a grace period when it is desired to advance the processor's callbacks. Advantageously, this operation is performed while holding the ->lock of the processor's leaf rcu_node structure 54, so this is an opportune time to assign grace-period numbers to any newly arrived callbacks. In addition, a processor 4 will periodically invoke the grace period detection and callback processing component 36 to start a new grace period. This operation is also performed while holding the root rcu_node structure's ->lock field, so this is also a suitable time to assign grace-period numbers to newly arrived callbacks. The same holds true for a processor 4 that invokes the grace period detection and callback processing component 36 to clean up after a newly completed grace period. Finally, a processor 4 will periodically invoke the grace period detection and callback processing component 36 to report the last quiescent state for a grace period. This operation is performed while holding the root rcu_node structure's ->lock, so this too is a good place to assign grace-period numbers to newly arrived callbacks.

Figure 9:
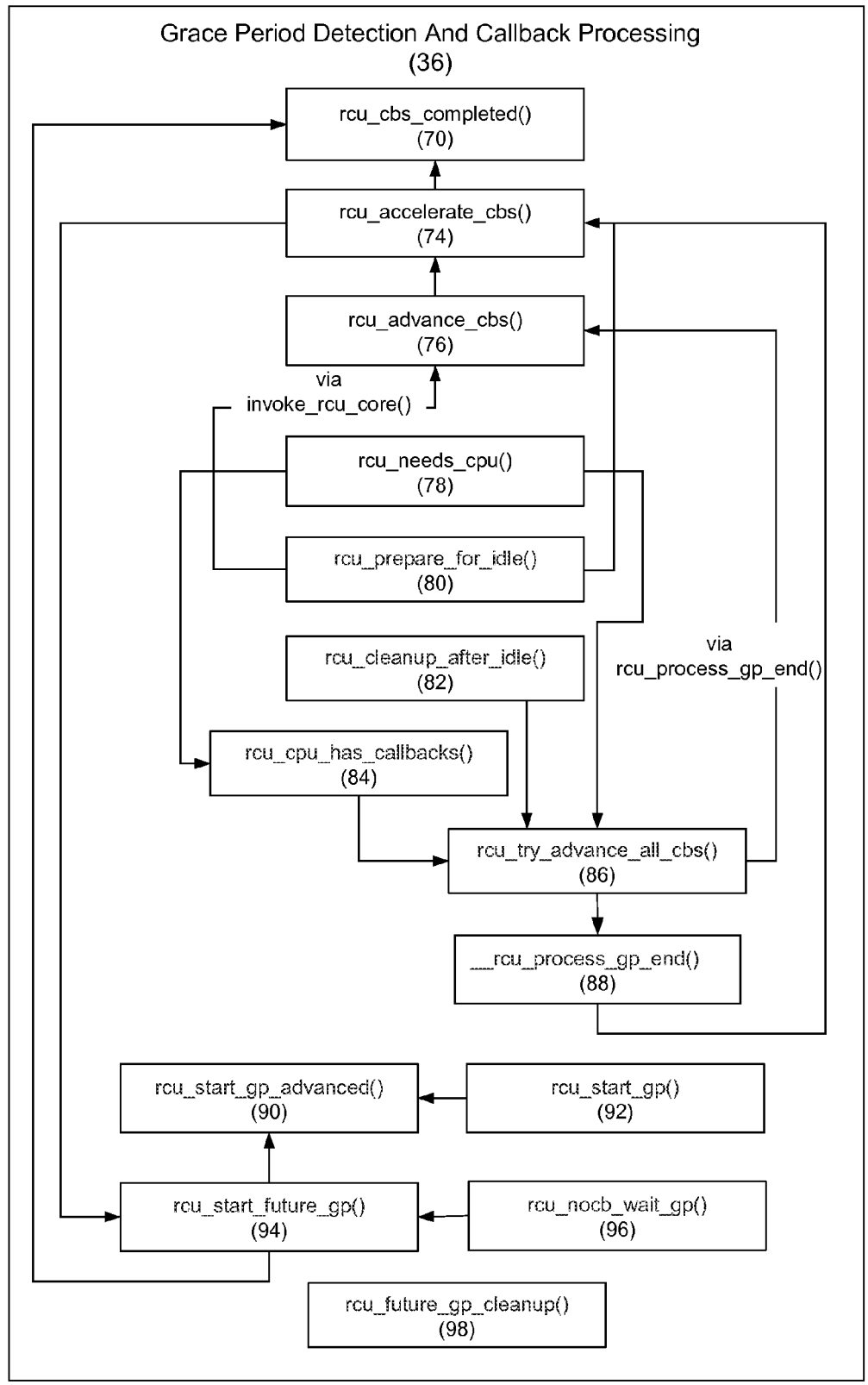
FIG. 9 is a functional block diagram showing additional example RCU subsystem support functions.

An example technique for determining what grace-period number to assign to newly arrived callbacks is covered in Section 1.1 entitled "Determining Grace Period Number." An example technique for actually assigning the grace-period number is covered in Section 1.2 entitled "Accelerating Callbacks." Thereafter, Section 1.3 entitled "Advancing Callbacks" covers an example technique for managing groups of callbacks whose grace-period numbers have already been assigned and determining when they may be safely invoked. FIG. 9, which represents a detailed view of the grace period detection and callback processing component 36 of FIG. 5, illustrates various functions that may be used to perform the described operations.

1.1 Determining Grace Period Number

Before a grace-period number can be assigned, it is necessary to determine which grace period's completion will guarantee that a full grace period has elapsed for the callbacks in question. This job is carried out by the grace period detection and callback processing component 36 using a function 70 that may be named "rcu_cbs_completed( )." The rcu_cbs_completed( ) function 70 is part of the grace period detection and callback processing component 36, and is shown in FIG. 9. Example C-language pseudocode for the rcu_cbs_completed( ) function 70 is shown in Pseudocode Listing 1 below.

| Pseudocode Listing 1 -- rcu_cbs_completed( ) |
| --- |
| 1 static unsigned long rcu_cbs_completed(struct rcu_state *rsp, <br> 2                                           struct rcu_node *rnp) <br> 3 { <br> 4   if (rcu_get_root(rsp) == rnp && rnp->gpnum == rnp->completed) <br> 5     return rnp->completed + 1; <br> 6   return rnp->completed + 2; <br> 7 } |

As can be seen, the rcu_cbs_completed( ) function 70 inspects the ->completed field of the rcu_node structure 54 whose ->lock is currently held, and returns a number that is two greater than the value of the ->completed for that rcu_node structure, unless the specified rcu_node structure is the root and the ->gpnum and ->completed fields are equal.

In the case of the root rcu_node structure 54, if the ->gpnum and ->completed fields are equal, there is no grace period in progress, so that the end of the next grace period will suffice. Line 5 in Pseudocode Listing 1 thus returns a value that adds one to the root rcu_node structure's ->completed field. But if the root rcu_node's ->gpnum and ->completed fields differ, there is a grace period currently in progress, so that it is necessary to wait for this in-progress grace period as well as the next grace period. Line 6 in Pseudocode Listing 1 thus returns a value that adds two to the root rcu_node structure's ->completed field.

The root rcu_node structure is the only one that can decisively determine that there is no grace period in progress. After all, the various ->gpnum and ->completed fields cannot be updated atomically, and any attempt to do so would create a performance and scalability bottleneck. Because the root rcu_node structure 54 is updated first, it is the only one that can be trusted to know exactly when the grace period started. Therefore, the non-root rcu_node structures 54 have to allow for a grace period being in progress even when their ->gpnum and ->completed fields are equal. Therefore, for non-root rcu_node structures 54, line 6 of Pseudocode Listing 1 unconditionally returns a value that adds two to the rcu_node structure's ->completed field.

1.2 Accelerating Callbacks

Figure 10:
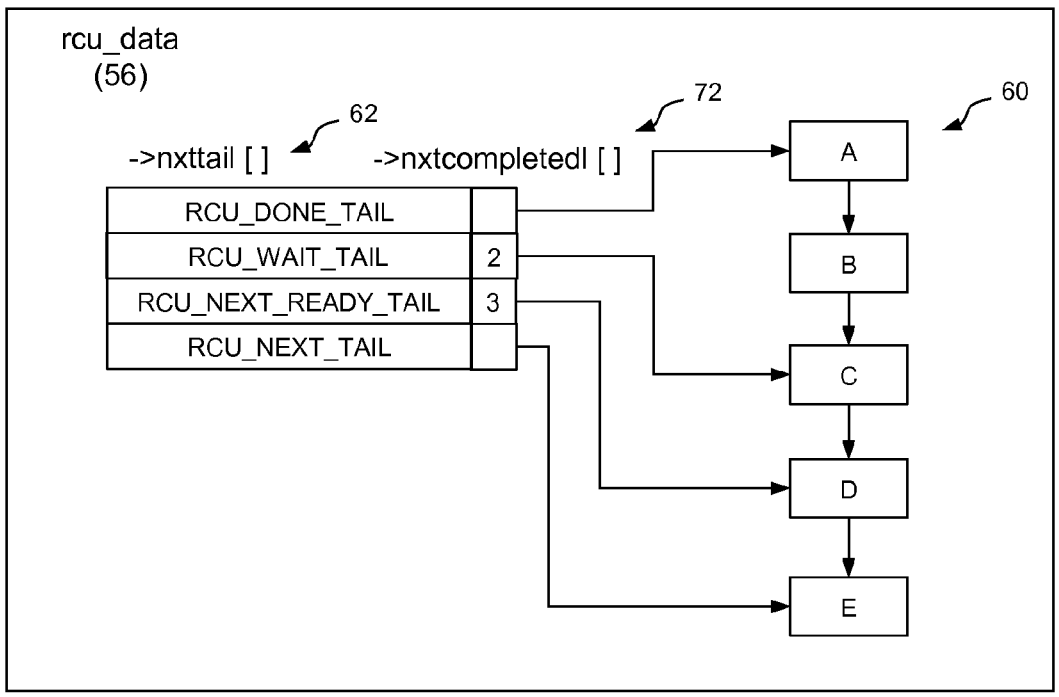
FIG. 10 is a functional block diagram showing additional components of an example rcu_data structure, namely, a ->nxtcompleted[ ] array for assigning grace period numbers to the RCU callback sublists identified by the ->nxttail [ ] array.

Once the grace-period number is determined, the next question is where to store it. In an example embodiment, the grace period number is stored in a ->nxtcompleted[ ] array 72 of a processor's rcu_data structure 56, parallel to the existing nxttail[ ] array 62 that stores the tail pointers. This is shown in FIG. 10. The entry corresponding to RCU_DONE_TAIL is blank because it is meaningless: once a callback has waited for a grace period, the exact grace period it waited for is no longer relevant. The entry corresponding to RCU_NEXT_TAIL is also meaningless: Callbacks in this sublist by definition have not yet been assigned a grace-period number. In contrast, in the example processor state shown FIG. 10, callbacks B and C in the RCU_WAIT_TAIL sublist are waiting for grace period 2 to complete, while callback D in the RCU_NEXT_READY_TAIL sublist is waiting for grace period 3 to complete.

The job of assigning grace-period numbers to callbacks is undertaken by another function 74 that may be named "rcu_accelerate_cbs( )" The rcu_accelerate_cbs( ) function 74 is part of the grace period detection and callback processing component 36, and is shown in FIG. 9. Example C-language pseudocode for this function is shown in Pseudocode Listing 2 below.

Pseudocode Listing 2 -- rcu_accelerate_cbs( )

```
1   static void rcu_accelerate_cbs(struct rcu_state *rsp,
2                                  struct rcu_node *rnp, struct rcu_data *rdp)
3   {
4     unsigned long c;
5     int i;
6
7     if (!rdp->nxttail[RCU_NEXT_TAIL] ||
        !*rdp->nxttail[RCU_DONE_TAIL])
8       return;
9     c = rcu_cbs_completed(rsp, rnp);
10    for (i = RCU_NEXT_TAIL - 1; i > RCU_DONE_TAIL; i--)
11      if (rdp->nxttail[i] != rdp->nxttail[i - 1] &&
12          !ULONG_CMP_GE(rdp->nxtcompleted[i], c))
13        break;
14    if (++i >= RCU_NEXT_TAIL)
15      return;
16    for (; i <= RCU_NEXT_TAIL; i++) {
17      rdp->nxttail[i] = rdp->nxttail[RCU_NEXT_TAIL];
18      rdp->nxtcompleted[i] = c;
19    }
20    if (!*rdp->nxttail[RCU_WAIT_TAIL])
21      trace_rcu_grace_period(rsp->name, rdp->gpnum,
          "AccWaitCB");
22    else
23      trace_rcu_grace_period(rsp->name, rdp->gpnum,
          "AccReadyCB");
24  }
```

The rcu_accelerate_cbs( ) function 74 checks to see if a callback sublist is available for new callbacks, or if the grace-period number already assigned to one of the sublists works for the newly arrived callbacks, and in either case merges the new callbacks into the sublist in question. Finally, it cleans up pointers and values so that the RCU callback list 60 is properly formatted. The acceleration is relative to avoiding calling the rcu_accelerate_cbs( ) function 74, and letting the next call to the rcu_advance_cbs( ) function (see below) do the job.

Line 7 of Pseudocode Listing 2 checks to see if the processor is offline or is a no-callbacks processor (first condition), or if it has no callbacks waiting for a not-yet-completed grace period (second condition), and if either of these two cases hold, line 8 returns to the caller. Line 9 invokes the rcu_cbs_completed( ) function to obtain the number of the grace period that newly arrived callbacks must wait for. Recall that newly arrived callbacks are those on the RCU_NEXT_TAIL sublist. The loop spanning lines 10-14 scans backwards (from RCU_NEXT_TAIL towards RCU_DONE_TAIL) to find the smallest-indexed sublist into which newly arrived callbacks can be placed, but assuming that any waiting callbacks have been compressed to the beginning of the list (see rcu_advance_cbs( ) below). An example of an uncompressed callback list would have an empty RCU_WAIT_TAIL sublist but a non-empty RCU_NEXT_READY_TAIL sublist. The "if" statement spanning lines 11-12 finds the first non-empty sublist (line 11) whose assigned grace-period number is unsuitable for newly arrived callbacks (line 12), at which point line 13 breaks from the loop. Unsuitable in this context means that the grace period number in the sublist's ->nxtcompleted field 72 is less than the grace period number required for newly arrived callbacks (as determined in line 9). Because the "if" statement actually found the largest-indexed sublist into which newly arrived callbacks could not be placed, line 14 increments to the next sublist, and if that sublist is RCU_NEXT_TAIL (which is where the newly arrived callbacks are to begin with), then line 15 returns to the caller. The loop spanning lines 16-19 then moves the newly arrived callbacks from the RCU_NEXT_TAIL sublist to their destination, setting the assigned grace-period number to that determined by line 9. Finally, lines 20-24 do event tracing.

1.3 Advancing Callbacks

When the end of their assigned grace period is reached, callbacks must be moved into RCU_DONE_TAIL so that they can be invoked. This job is handled by a function 76 that may be named "rcu_advance_cbs( )" The rcu_advance_cbs( ) function 76 is part of the grace period detection and callback processing component 36, and is shown in FIG. 9. Example C-language pseudocode for this function is shown in Pseudocode Listing 3 below.

Pseudocode Listing 3 -- rcu_advance_cbs( )

```
1   static void rcu_advance_cbs(struct rcu_state *rsp, struct
2                               rcu_node *rnp, struct rcu_data *rdp)
3   {
4     int i, j;
5
6     if (!rdp->nxttail[RCU_NEXT_TAIL] ||
        !*rdp->nxttail[RCU_DONE_TAIL])
7       return;
8     for (i = RCU_WAIT_TAIL; i < RCU_NEXT_TAIL; i++) {
9       if (ULONG_CMP_LT(rnp->completed, rdp->nxtcompleted[i]))
10        break;
11      rdp->nxttail[RCU_DONE_TAIL] = rdp->nxttail[i];
12    }
13    for (j = RCU_WAIT_TAIL; j < i; j++)
14      rdp->nxttail[j] = rdp->nxttail[RCU_DONE_TAIL];
15    for (j = RCU_WAIT_TAIL; i < RCU_NEXT_TAIL; i++, j++) {
16      if (rdp->nxttail[j] == rdp->nxttail[RCU_NEXT_TAIL]) {
17        break;
18      }
19      rdp->nxttail[j] = rdp->nxttail[i];
20      rdp->nxtcompleted[j] = rdp->nxtcompleted[i];
21    }
22    rcu_accelerate_cbs(rsp, rnp, rdp);
23  }
```

Line 6 of the Pseudocode Listing 3 checks to see if the processor is offline or is a no-callbacks processor (first condition), or if it has no callbacks waiting for a not-yet-completed grace period (second condition), and if any of these three cases hold, line 7 returns to the caller. The loop spanning lines 8-12 handles the first stage of moving callbacks whose assigned grace period has completed to the RCU_DONE_TAIL, with line 8 sequencing through the sublists that have ->nxtcompleted numbers assigned. Line 9 checks to see if the current sublist's grace period has not yet completed (by comparing its ->nxtcompleted field against the ->completed field of the rcu_node structure 54 whose lock is held), and if it has not, line 10 breaks out of the loop. Otherwise, line 11 merges the current sublist into the RCU_DONE_TAIL sublist.

Figure 11:
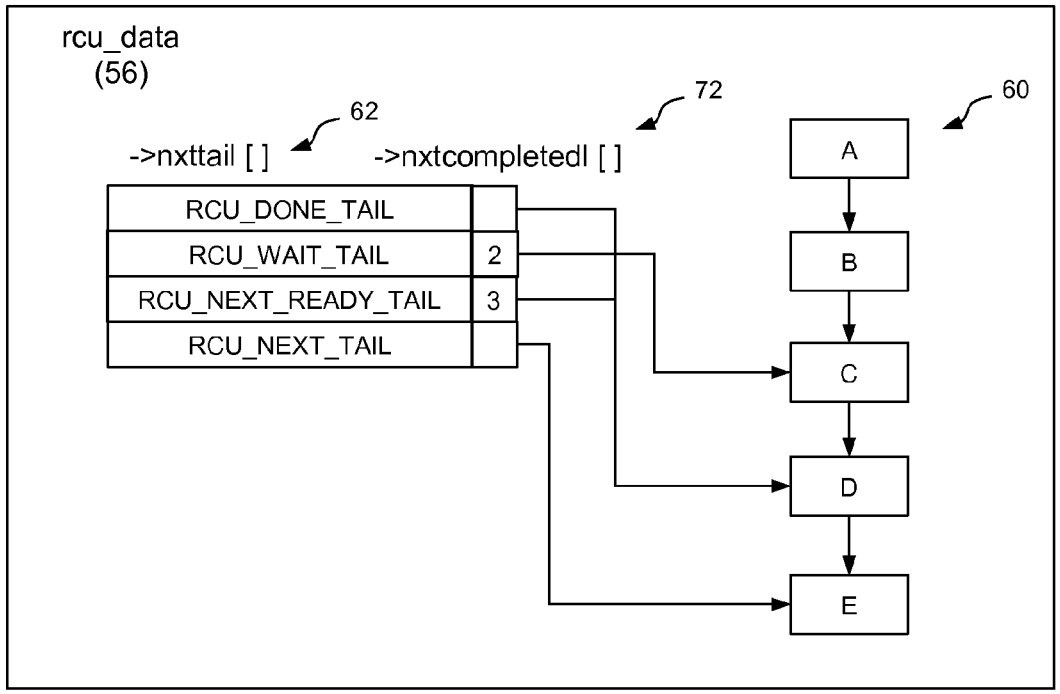
FIG. 11 is a functional block diagram showing the example rcu_data structure of FIG. 10, with the sublist tail pointers in another state.
Figure 12:
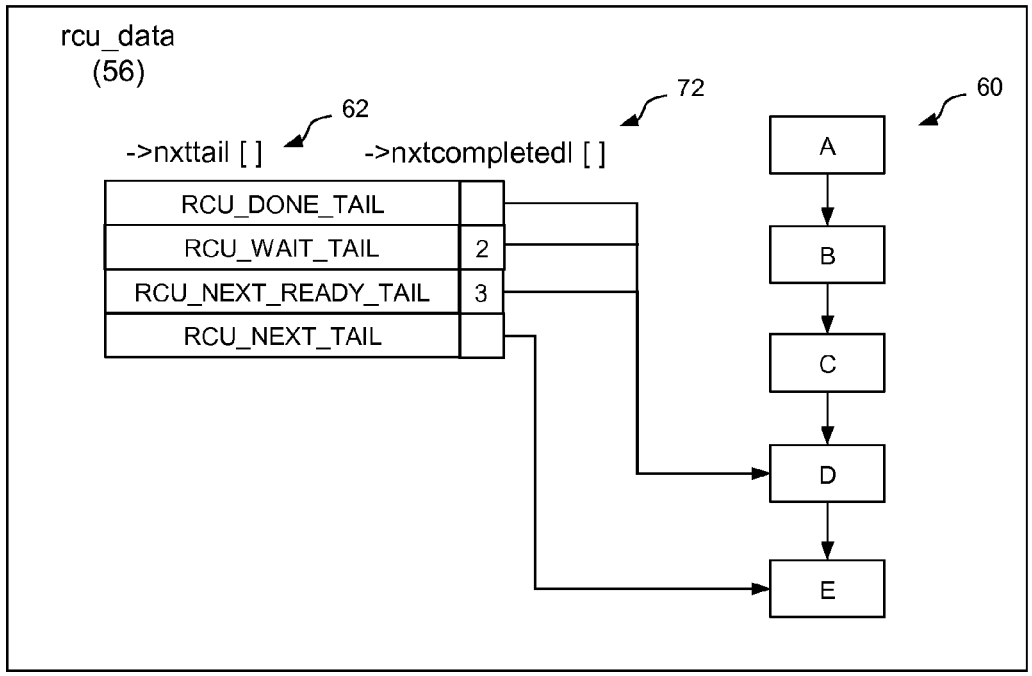
FIG. 12 is a functional block diagram showing the example rcu_data structure of FIG. 10, with the sublist tail pointers in another state.

The foregoing operation can leave the callback list 60 in an inconsistent state. For example, if the ->completed field of the rcu_node structure 54 was equal to 3, the loop of lines 8-12 would transform the list 60 as shown in FIG. 10 into the state shown in FIG. 11. As can be seen, the RCU_WAIT_TAIL pointer has not been advanced to catch up with the RCU_DONE_TAIL pointer. The loop spanning lines 13 and 14 does the needed correction, so that the callback list 60 is as shown in FIG. 12.

Figure 13:
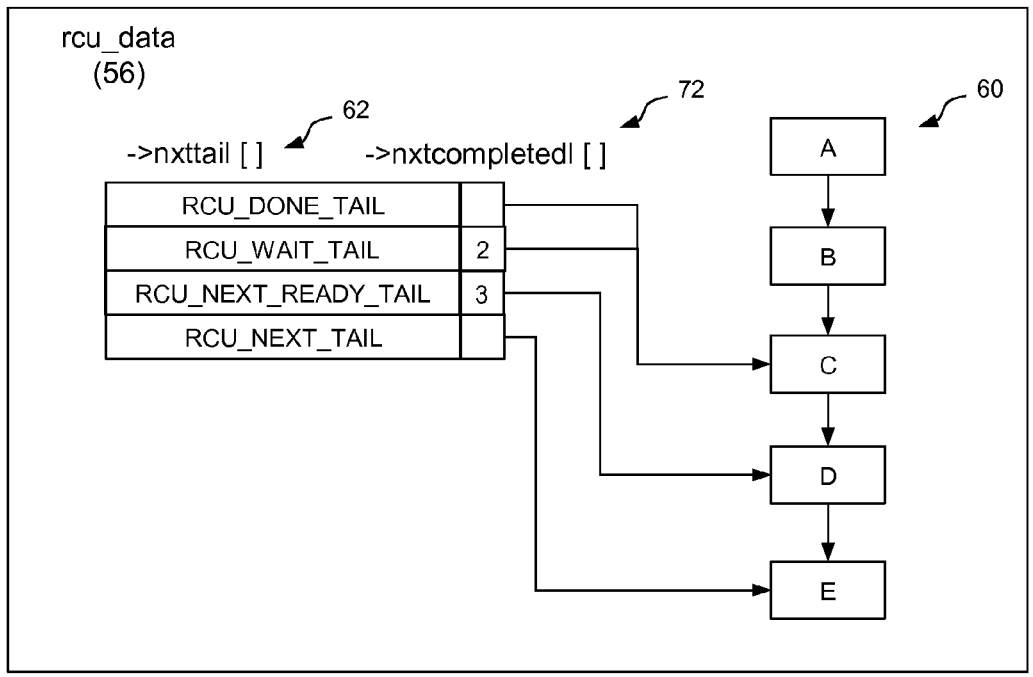
FIG. 13 is a functional block diagram showing the example rcu_data structure of FIG. 10, with the sublist tail pointers in another state.
Figure 14:
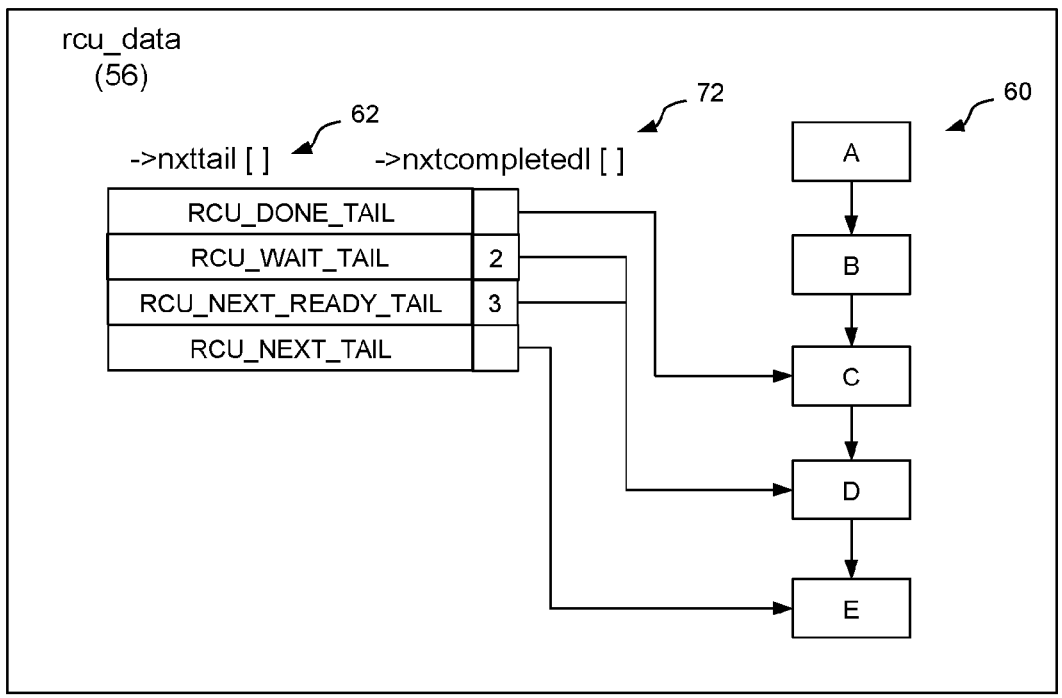
FIG. 14 is a functional block diagram showing the example rcu_data structure of FIG. 10, with the sublist tail pointers in another state.

A scenario may arise in which the first two loops (lines 8-14) are run starting again with the callback list shown in FIG. 10, but this time with the value of the ->completed field of the rcu_node structure 54 is equal to two. The result will be as shown in FIG. 13. The problem is that the RCU_WAIT_TAIL is empty, but the RCU_NEXT_READY_TAIL is not, which leaves a hole in the callback list 60. Leaving the list 60 in this state could needlessly prevent a future call to the rcu_accelerate_cbs( ) function 74 from assigning grace-period numbers to newly arrived callbacks because the RCU_NEXT_READY_TAIL sublist would already be occupied. Therefore, the loop spanning lines 15-19 copies later sublists down to eliminate holes, so that the resulting list would be as shown in FIG. 14. Line 15 sequences through the midlist sublists. If line 16 finds that the potential-destination sublist and all subsequent sublists are empty, then line 17 breaks from the loop. Otherwise, if there are non-empty sublists remaining, lines 19 and 20 copy the next sublist down to fill in the hole. Finally, line 22 invokes the rcu_accelerate_cbs( ) function 74 to assign grace-period numbers to any newly arrived callbacks. Acceleration of callbacks might seem unnecessary in the case where the loop spanning 15-19 is exited via line 17, insofar as the RCU_NEXT_TAIL sublist that would otherwise contain new arrivals is empty. However, the rcu_accelerate_cbs( ) function 74 can also recalculate the grace-period assignments. This recalculation is useful if the initial calculation was made using a non-root rcu_node structure 54, but the root rcu_node structure is currently being referenced.

2. Reducing Idle-Entry Exit Overhead

As stated by way of introduction above, the disclosed technique contemplates proactive numbering of groups of RCU callbacks, particularly newly arrived callbacks, on a given processor at idle-entry/exit time to minimize grace-period latency, thus eliminating the need to repeatedly run through the RCU state machine. The present section 2 describes various example functions that may be used to implement this functionality.

Current RCU_FAST_NO_HZ processing runs though the RCU state machine, including forcing quiescent states, up to five times on each idle entry. This can consume significant processing resources, especially on large systems, where the quiescent-state forcing does a full scan of all processors. Callback numbering permits a much less CPU-intensive idle-entry strategy to be used. In an example embodiment of the technique disclosed herein, an attempt is made to advance callbacks during preparation for idle entry, accelerate them on idle entry, and advance them again on idle exit. A function named "rcu_needs_cpu( )" attempts to advance callbacks during preparation for idle entry. The rcu_needs_cpu( )function is shown by reference number 78 in FIG. 9, and is described in more detail below. The only condition in which the rcu_needs_cpu( ) function 78 refuses dyntick-idle entry is if there are callbacks ready to invoke. In addition, the rcu_needs_cpu( )function 78 advances callbacks as much as possible, so that another function named "rcu_prepare_for_idle( )" can enter dyntick-idle mode with a minimum of overhead: It need only accelerate callbacks and check for the appearance of non-lazy callbacks in case of dyntick-idle re-entry. Non-lazy callbacks are RCU callbacks that take some action other than merely freeing memory, for example, awakening some task, which cannot be safely delayed without the risk of delaying some important operation. For example, indefinitely delaying the RCU callback corresponding to a synchronize_rcu( )invocation could hang the system. In contrast, lazy callbacks involve only the freeing of memory, so that they may be delayed without harm on a system with ample quantities of free memory. The rcu_prepare_for_idle( )function is shown by reference number 80 in FIG. 9, and is also described in more detail below. A third function named "rcu_cleanup_after_idle( )" advances callbacks and causes any now-ready callbacks to be invoked on idle exit. The rcu_cleanup_after_idle( )function is shown by reference number 82 in FIG. 9, and is likewise described in more detail below.

The rcu_needs_cpu function 78, the rcu_prepare_for_idle( ) function 80, and the rcu_cleanup_after_idle( ) function 82 rely on several fields in the per-processor rcu_dynticks data structures 58. Example C-language versions of these fields are shown in Pseudocode Listing 4 below.

| | Pseudocode Listing 4 - Fields of the rcu_dynticks data structures 58 |
|---|---|
| 1 | bool all_lazy; /* Are all CPU's CBs lazy? */ |
| 2 | unsigned long nonlazy_posted; /* # times non-lazy CBs posted to CPU. */ |
| 3 | unsigned long nonlazy_posted_snap; /* idle-period nonlazy_posted |
| 4 | snapshot. */ |
| 5 | unsigned long last_accelerate; /* Last jiffy CBs were accelerated. */ |

In Pseudocode Listing 4, the ->all_lazy field indicates that all of a processor's callbacks were lazy at the time of the processor's last invocation of the rcu_needs_cpu( ) function 78. The ->nonlazy_posted field is a running count of the non-lazy callbacks registered by this processor. The ->nonlazy_posted_snap field is a snapshot of the ->nonlazy_posted field at the time of the processor's last invocation of the rcu_needs_cpu( ) function 78. The last accelerate field records the value of the jiffies counter at the time of the last idle-entry callback advancement or acceleration.

The rcu_needs_cpu function 78, the rcu_prepare_for_idle( ) function 80, and the rcu_cleanup_after_idle( ) function 82, together with addition helper functions, are described in the ensuing sections. Section 2.1 entitled "Does a Processor Have RCU Callbacks" describes an example callback-determination technique. Section 2.2 entitled "Attempting to Advance Callbacks" describes attempting to advance callbacks. Section 2.3 entitled "Does RCU Need This Processor" describes determining whether the RCU subsystem 20 needs the current processor. Section 2.4 entitled "Preparing a Processor For Idle" describes preparing a processor to enter dyntick-idle mode. Section 2.5 entitled "Cleaning Up After a Processor Exits Idle" describes cleanup actions once a processor exits dyntick-idle mode.

2.1 Does A Processor have RCU Callbacks

Pseudocode Listing 5 below shows example C-language pseudocode for a helper function that may be named "rcu_cpu_has_callbacks( )" which checks for a processor having callbacks, and if so, whether all of them are lazy. The rcu_cpu_has_callbacks( ) helper function is shown by reference number 84 in FIG. 9. Interrupts must be disabled by the caller if these determinations are to be exact (otherwise, callbacks might be enqueued or invoked while this function was running)

Pseudocode Listing 5 - rcu_cpus_has_callbacks( )

```
1   static bool rcu_cpu_has_callbacks(int cpu, bool *all_lazy)
2   {
3       bool al = true;
4       bool ht = false;
5       struct rcu_data *rdp;
6       struct rcu_state *rsp;
7
8       for_each_rcu_flavor(rsp) {
9           rdp = per_cpu_ptr(rsp->rda, cpu);
10          if (rdp->qlen != rdp->qlen_lazy)
11              al = false;
12          if (rdp->nxtlist)
13              hc = true;
14      }
15      if (all_lazy)
16          *all_lazy = al;
17      return hc;
18  }
```

In Pseudocode Listing 5, the loop spanning lines 8-14 checks each RCU flavor implemented by the RCU subsystem 20. Line 9 obtains a pointer to the specified processor's rcu_data structure 56. If line 10 determines that there is at least one non-lazy callback, line 11 sets local variable "al" to false. If line 12 determines that there is at least one callback present on the processor's callback list 60, line 13 sets local variable "hc" to true. Upon exit from the loop, if line 15 determines that the all_lazy parameter in the processor's rcu_dynticks data structures 58 is non-NULL, line 16 stores an indication of whether or not all callbacks are lazy. Either way, line 17 informs the caller as to whether this processor has RCU callbacks.

2.2 Attempting to Advance Callbacks

Pseudocode Listing 6 shows example C-language pseudocode that may be used to implement another helper function that may be named "rcu_try_advance_all_cbs( )." The rcu_try_advance_all_cbs( ) helper function is shown by reference number 86 in FIG. 9. This function attempts to advance callbacks for each RCU flavor for the current processor. The main concern is to avoid excessive contention on the ->lock fields of the leaf rcu_node structures 54.

Pseudocode Listing 6 - rcu_try_advance_all_cbs( )

```
1   static bool rcu_try_advance_all_cbs(void)
2   {
3       bool cbs_ready = 0;
4       struct rcu_data *rdp;
5       struct rcu_node *rnp;
6       struct rcu_state *rsp;
7
8       for_each_rcu_flavor(rsp) {
9           rdp = this_cpu_ptr(rsp->rda);
10          rnp = rdp->mynode;
11          if (rdp->completed != rnp->completed &&
12              rdp->nxttail[RCU_DONE_TAIL] !=
                    rdp->nxttail[RCU_NEXT_TAIL])
13              rcu_process_gp_end(rsp, rdp);
14          if (cpu_has_callbacks_read_to_invoke(rdp))
15              cbs_ready = 1;
16      }
17      return cbs_ready;
18  }
```

In Pseudocode Listing 6, each pass through the loop spanning lines 8-16 attempts to advance callbacks for one flavor of RCU implemented by the processor. Line 9 obtains a reference to this processor's rcu_data structure 56, and line 10 obtains a reference to the corresponding leaf rcu_node structure 54. If line 11 determines that a grace period has completed since the last attempt and line 12 determines that there are callbacks that are not yet known to be ready to invoke, line 13 invokes a function named "_rcu_process_gp_end( )" via a wrapper function named "rcu_process_gp_end( )." The _rcu_process_gp_end( ) function, which is shown by reference number 88 in FIG. 9, handles end-of-grace-period processing, including invoking the rcu_advance_cbs( ) function 76. In either case, if line 14 determines that this RCU flavor has callbacks ready to invoke, line 15 indicates that this processor has callbacks that are ready to invoke. Once all RCU flavors have been checked and possibly advanced, line 17 returns the indication as to whether this processor has callbacks ready to invoke.

2.3 Does RCU Need This Processor?

Pseudocode Listing 7 shows example C-language pseudocode that may be used to implement the rcu_needs_cpu( ) function 78, which does initial idle-entry preparation and then indicates whether RCU is prepared to allow a processor to enter dyntick-idle mode, in which scheduling-clock interrupts are suppressed.

Pseudocode Listing 7 - rcu_needs_cpu( )

```
1   int rcu_needs_cpu(int cpu, unsigned long *dj)
2   {
3       struct rcu_dynticks *rdtp = &per_cpu(rcu_dynticks, cpu);
4       struct rcu_data *rdp;
5       struct rcu_state *rsp;
6
7       rdtp->nonlazy_posted_snap = rdtp->nonlazy_posted;
8       if (!rcu_cpu_has_callbacks(cpu, &rdtp->all_lazy)) {
9           *dj = ULONG_MAX;
10          return 0;
11      }
12      if (rcu_try_advance_all_cbs( )) {
13          invoke_rcu_core( );
14          return 1;
15      }
16      rdtp->last_accelerate = jiffies;
17      if (rdtp->all_lazy)
18          *dj = round_jiffies(rcu_idle_lazy_gp_delay + jiffies) - jiffies;
19      else
20          *dj = round_up(rcu_idle_gp_delay + jiffies,
21              rcu_idle_gp_delay) - jiffies;
22      return 0;
23  }
```

In Pseudocode Listing 7, line 7 takes a snapshot of the running count of the number of non-lazy callbacks posted by this processor, which will be used by the rcu_prepare_for_idle( ) function 80 to determine whether the delay strategy should be shifted from the long delay associated with processors having only lazy callbacks queued to the much shorter delays associated with processors having at least one non-lazy callback queued. If line 8 determines that this processor has no callbacks, then line 9 sets an indefinite dyntick-idle sojourn and line 10 indicates to the caller that this processor does not need RCU. In either case, line 8 (via its invocation of the rcu_cpu_has_callbacks( ) function 84) also updates ->all_lazy with an indication of whether or not this processor has any non-lazy callbacks. Otherwise, line 12 invokes the rcu_try_advance_callbacks( ) function 86 to advance callbacks on this processor. If there now callbacks ready to invoke, line 13 initiates later RCU core processing (e.g., in kthread context) to invoke those callbacks and line 14 indicates to the caller that RCU does need this processor. If there are still callbacks queued on this processor, but none are ready to invoke, processing reaches line 16, which records the current time as the last time that callbacks were accelerated. This is used by the rcu_prepare_for_idle( ) function 80 to keep lock contention bounded in cases where the idle loop quickly enters and exits dyntick-idle mode in rapid sequence, as can happen due to tracing and power-control operations in the idle loop when those operations use RCU. If line 17 determines that all callbacks on this processor are lazy, then line 18 sets a long dyntick-idle sojourn (roughly six seconds by default), but adjusted so that other timers can be serviced by the same power-hungry processor-wakeup operation as for RCU. Otherwise, lines 20 and 21 set a much shorter delay, rounded to a multiple of that delay so that if multiple processors in a given package are in dyntick-idle mode with non-lazy callbacks, a single wakeup will handle all those processors. Finally, line 22 indicates to the caller that RCU does not immediately need this processor.

2.4 Preparing a Processor for Idle

Pseudocode Listing 8 shows example C-language pseudocode that may be used to implement the rcu_prepare_for_idle( ) function 80, which performs the actual idle-entry processing, preparing a processor for idle from RCU's perspective, including checking to determine if any non-lazy RCU callbacks have arrived at a processor that previously had only lazy RCU callbacks.

| Pseudocode Listing 8 - rcu_prepare_for_idle( ) |
| --- |
| 1   static void rcu_prepare_for_idle(int cpu) |
| 2   { |
| 3       struct rcu_data *rdp; |
| 4       struct rcu_dynticks *rdtp = &per_cpu(rcu_dynticks, cpu); |
| 5       struct rcu_node *rnp; |
| 6       struct rcu_state *rsp; |
| 7 |
| 8       if (is_nocb_cpu(cpu)) |
| 9           return; |
| 10      if (rdtp->all_lazy && |
| 11          rdtp->nonlazy_posted != rdtp->nonlazy_posted_snap) { |
| 12          invoke_rcu_core( ); |
| 13          return; |
| 14      } |
| 15      if (rdtp->last_accelerate == jiffies) |
| 16          return; |
| 17      rdtp->last_accelerate = jiffies; |
| 18      for_each_rcu_flavor(rsp) { |
| 19          rdp = per_cpu_flavor(rsp->rda, cpu); |
| 20          if (!*rdp->nexttail[RCU_DONE_TAIL]) |
| 21              continue; |
| 22          rnp = rdp->mynode; |
| 23          raw_spin_lock(&rnp->lock); /* irqs already disabled. */ |
| 24          rcu_accelerate_cbs(rsp, rnp, rdp); |
| 25          raw_spin_unlock(&rnp->lock); /* irqs remain disabled. */ |
| 26      } |
| 27   } |

In Pseudocode Listing 8, if line 8 determines that this is a no-callbacks processor, line 9 returns to the caller. If line 10 determines that all callbacks were lazy at rcu_needs_cpu( ) time, and if line 11 determines that non-lazy callbacks have subsequently arrived, then line 12 initiates RCU-core processing for this processor (thus causing the rcu_needs_cpu( ) function 78 to be re-invoked, in turn causing the dyntick-idle sojourn to be recalculated) and line 13 returns to the caller. If line 15 determines that callbacks were recently accelerated, then line 16 returns to the caller, otherwise, lines 18-26 accelerate callbacks. Line 17 prevents overly aggressive re-acceleration for workloads that switch in and out of idle frequently. Each pass through the loop spanning lines 18-26 accelerates callbacks on the current processor belonging to one flavor of RCU. Line 19 obtains a pointer to the rcu_data structure 56 corresponding to the current processor and flavor of RCU. If line 20 determines that there are no callbacks that are waiting for a grace period to elapse (e.g., all are ready to invoke), then line 21 continues with the next flavor of RCU. Line 22 obtains a pointer to the leaf rcu_node structure 54 corresponding to this processor and RCU flavor. Line 23 then obtains that rcu_node structure's ->lock, line 24 invokes the rcu_accelerate_cbs( ) function 74 to assign grace-period numbers to callbacks, and line 25 releases the ->lock.

2.5 Cleaning Up after a Processor Exits Idle

Pseudocode Listing 9 shows example C-language pseudocode that may be used to implement the rcu_cleanup_after_idle( ) function 82, which advances callbacks on exit from dyntick-idle mode, initiating invocation of any callbacks whose grace period has now elapsed.

| Pseudocode Listing 9 - rcu_cleanup_after_idle( ) |
| --- |
| 1   static void rcu_cleanup_after_idle(int cpu) |
| 2   { |
| 3       struct rcu_data *rdp; |
| 4       struct rcu_state *rsp; |
| 5 |
| 6       if (is_nocb_cpu(cpu)) |
| 7           return; |
| 8       rcu_try_advance_all_cbs( ); |
| 9       for_each_rcu_flavor(rsp) { |
| 10          rdp = per_cpu_ptr(rsp->rda, cpu); |
| 11          if (cpu_has_callbacks_ready_to_invoke(rdp)) |
| 12              invoke_rcu_core( ); |
| 13      } |
| 14   } |

In Pseudocode Listing 9, line 6 checks to see if this is a no-callbacks processor, and if so, line 7 returns to the caller. Otherwise, line 8 invokes the rcu_try_advance_all_cbs( ) function 86. The loop spanning lines 9-13 then initiates callback invocation for all RCU flavors that now have callbacks that are ready to invoke. Line 10 obtains a pointer to the rcu_data structure 56 corresponding to the current RCU flavor and the current processor. If line 11 determines that there are callbacks ready to invoke, line 12 initiates their invocation by causing RCU core processing to run.

3. Recording Need for Future Grace Periods

As stated by way of introduction above, the disclosed technique contemplates recording the need for future grace periods so that these grace periods are not delayed due to a processor being asleep in dyntick-idle mode at the time that the preceding grace period ends. This section describes various example functions that may be used to implement such functionality.

Pseudocode Listing 10 shows example fields in the rcu_node data structures 54 that may be used to register future grace periods.

| Pseudocode Listing 10 - additional rcu_node data structures |
| --- |
| 1   #ifdef CONFIG_RCU_NOCB_CPU |
| 2       wait_queue_head_t nocb_gp_wq[2]; |
| 3   #endif /* #ifdef CONFIG_RCU_NOCB_CPU */ |
| 4       int need_future_gp[2]; |

In Pseudocode Listing 10, the ->nocb_gp_wq[ ] array is used by no-callbacks kthreads (rcu_nocb_kthread( )) to wait for the needed grace period to elapse. The ->need_future_gp[ ] is used to track requests for future grace periods. In both cases, only two elements are required because it is only necessary to register for two grace periods in the future: (1) Wait for the current grace period to complete, and then (2) wait for the following grace period to complete.

In the ensuing discussion, Section 3.1 entitled "Initiating Grace Periods" describes grace-period initiation operations that may be used to allow the need for future grace periods to be recorded. Section 3.2 entitled "Grace Period Recording" covers the mechanics of the actual recording. Section 3.3 entitled "Grace Period Cleanup" covers cleanup actions at the end of each grace period.

3. Initiating Grace Periods

Pseudocode Listing 11 shows example C-language pseudocode that may be used to implement a function named rcu_start_gp_advanced( ) (lines 1-10) and a function named rcu_start_gp( ) (lines 12-20). These functions are respectively shown by reference numbers 90 and 92 in FIG. 9. The rcu_advance_cbs( ) function 76 invokes the rcu_start_gp_advanced( ) function 90 and other callers invoke the rcu_start_gp( ) function 92. Both functions must be invoked with the root rcu_node structure's ->lock held.

```
Pseudocode Listing 11 - rcu_start_gp_advanced( ) and rcu_start_gp( )

1   static void
2   rcu_start_gp_advanced(struct rcu_state *rsp, struct rcu_node *rnp,
3                struct rcu_data *rdp)
4   {
5      if (!rsp->gp_kthread || !cpu_needs_another_gp(rsp, rdp)) {
6         return;
7      }
8      rsp->gp_flags = RCU_GP_FLAG_INIT;
9      wake_up(&rsp->gp_wq);
10  }
11
12  static void
13  rcu_start_gp(struct rcu_state *rsp)
14  {
15     struct rcu_data *rdp = this_cpu_ptr(rsp->rda);
16     struct rcu_node *rnp = rcu_get_root(rsp);
17
18     rcu_advance_cbs(rsp, rnp, rdp);
19     rcu_start_gp_advanced(rsp, rnp, rdp);
20  }
```

In Pseudocode Listing 11, if line 5 of the rcu_start_gp_advanced( ) function 90 finds that it is too early in boot (no RCU grace-period kthread yet) or that the processor does not need another grace period (including any future grace periods registered), then line 6 returns. Otherwise, line 8 sets a flag indicating that a new grace period is required, and line 9 wakes up the grace-period kthread. The rcu_start_gp( ) function 92 simply invokes rcu_advance_cbs( )(line 18) and then rcu_start_gp_advanced( ) (line 19).

3.2 Grade Period Recording

The main function used to register future needed grace periods may be named "rcu_start_future_gp( )" This function is designated by reference number 94 in FIG. 9. Example C-language pseudocode that may be used to implement the rcu_start_future_gp( ) function 94 is shown in Pseudocode Listing 12. The rcu_start_future_gp( ) function 94 registers the grace period that would be required for a newly arrived callback, and returns that grace-period number. The function also adjusts any callbacks currently queued on the rcu_data structure 56 referenced by "rdp," and if any are waiting on a later grace period, they are adjusted to wait on the grace period appropriate for a newly arrived callback. This can happen when callbacks are initially assigned a grace-period number with reference to a leaf rcu_node structure 54, but then a later call to the rcu_start_future_gp( ) function 94 references the root rcu_node structure 54. Note that the caller is required to have acquired the ->lock for the rcu_node structure 54 referenced by the rnp parameter.

```
Pseudocode Listing 12—rcu_start_future_gp( )

1   static unsigned long __maybe_unused
2   rcu_start_future_gp(struct rcu_node *rnp, struct rcu_data *rdp)
3   {
4      unsigned long c;
5      int i;
6      struct rcu_node *rnp_root = rcu_get_root(rdp->rsp);
7
8      c = rcu_cbs_completed(rdp->rsp, rnp);
9      trace_rcu_future_gp(rnp, rdp, c, "Startleaf");
10     if (rnp->need_future_gp[c & 0x1]) {
11        trace_rcu_future_gp(rnp, rdp, c, "Prestartleaf");
12        return c;
13     }
14     if (rnp->gpnum != rnp->completed ||
15             ACCESS_ONCE(rnp->gpnum) !=
16             ACCESS_ONCE(rnp->completed)) {
16        rnp->need_future_gp[c & 0x1]++;
17        trace_rcu_future_gp(rnp, rdp, c, "Startedleaf");
18        return c;
19     }
20     if (rnp != rnp_root)
21        raw_spin_lock(&rnp_root->lock);
22     c = rcu_cbs_completed(rdp->rsp, rnp_root);
23     for (i = RCU_DONE_TAIL; i < RCU_NEXT_TAIL; i++)
24        if (ULONG_CMP_LT(c, rdp->nxtcompleted[i]))
25           rdp->nxtcompleted[i] = c;
26     if (rnp_root->need_future_gp[c & 0x1]) {
27        trace_rcu_future_gp(rnp, rdp, c, "Prestartedroot");
28        goto unlock_out;
29     }
30     rnp_root->need_future_gp[c & 0x1]++;
31     if (rnp_root->gpnum != rnp_root->completed) {
32        trace_rcu_future_gp(rnp, rdp, c, "Startedleafroot");
33     } else {
34        trace_rcu_future_gp(rnp, rdp, c, "Startedroot");
35        rcu_start_gp_advanced(rdp->rsp, rnp_root, rdp);
36     }
37  unlock_out:
38     if (rnp != rnp_root)
39        raw_spin_unlock(&rnp_root->lock);
40     return c;
41  }
```

Line 8 invokes the rcu_cbs_completed( ) function 70 to obtain the grace-period number for newly arrived callbacks. If the "rnp" parameter references a leaf rcu_node structure, this grace-period number might be overly conservative, as noted above. Line 9 does event tracing using a simple helper function. Line 10 checks the ->need_future_gp[ ] array in the rcu_node structure 54 whose lock is held in order to determine whether the needed grace-period number has already been requested. If it has, line 11 does event tracing and line 12 returns to the caller. Note that the two-element ->need_future_gp[ ] array in each rcu_node structure 54 suffices. To see this, consider the following cases:

1. There is a grace period in progress. Any newly registered callback will be satisfied by the next grace period.

2. There is no grace period in progress. Again, any newly registered callback will be satisfied by the next grace period.

3. A grace period might or might not be in progress, for example, when a leaf rcu_node structure 54 does not yet believe that a grace period has started. In this case, a processor registering a future grace-period need based on a leaf rcu_node structure will wait for the current/next grace period (depending) and on the one following that. In contrast, a processor registering a future grace-period need based on the root rcu_node structure can wait only for the next grace period in the case where there is no grace period in progress.

This distinction between leaf and root rcu_node structures 54 is required to avoid race conditions that can result when requests for new grace periods arrive concurrently with initialization of a newly started grace period. The root rcu_node structure 54 has definite knowledge of whether or not a grace period is in progress, while non-root rcu_node structures can only know when a grace period is definitely in progress: They can never be sure that there is no grace period in progress. This is because a new grace period might have started, but rcu_node initialization might not yet have reached the non-root rcu_node structure 54 in question.

In Pseudocode Listing 12, if line 14 (for the current rcu_node structure) and line 15 (for the root rcu_node structure, but unsynchronized) detect that a grace period is in progress, then line 16 requests the grace period number obtained by line 8, line 17 does event tracing, and line 18 returns to the caller. The lack of synchronization is permissible because the ->lock of the rcu_node structure 54 referenced by the rnp parameter is held. If this structure believes that a grace period is in progress, then there definitely is a grace period in progress. On the other hand, if this structure does not believe that a grace period is in progress and one has in fact started, it will not be possible to finish starting it because the current processor holds the rnp->lock. Therefore, if the root rnp_node structure 54 believes that a grace period is in progress, this grace period must remain in progress while the current processor holds the rnp->lock, and the comparison is stable. In contrast, if the unsynchronized accesses on line 15 determine that a grace period is not in progress, this comparison is unstable because a grace period might start at any time. But this is acceptable because subsequent code rechecks while holding the root rcu_node structure's ->lock. In contrast, any comparison that leads to the body of the "if" statement on lines 14-19 will be stable.

If there does not appear to be a grace period in progress, execution proceeds to line 20, which checks to see if the rcu_start_future_gp( ) function 94 was invoked on the root rcu_node structure 54, and, if not, line 21 acquires the root rcu_node structure's ->lock. Line 22 then calls the rcu_cbs_completed( ) function 70 to refresh the required grace period number, but this time referencing the root rcu_node structure, thus obtaining an exact answer. The loop spanning lines 23-25 scans the callbacks on the current processor's rcu_data structure 56, updating any callback groups waiting for a later grace period to instead wait for the grace period identified by line 22.

If line 26 determines that the root rcu_node structure 54 has already registered for the required grace-period number, line 27 does event tracing and line 28 branches to the end of the rcu_start_future_gp( ) function 94 so as to release locks and return. Otherwise, line 30 registers for the required grace-period number in the root rcu_node structure's ->need_future_gp[ ] array. In line 31, if the root rcu_node structure 54 has no record of an ongoing grace period, line 35 invokes the rcu_start_gp_advanced( ) function 90 to start one, with the proviso that callback advancement has already taken place. Lines 32 and 34 do event tracing. Line 37 is the label branched to by line 28. If line 38 determines that "rnp" and "rnp_root" reference distinct rcu_node structures 54, line 39 releases the root rcu_node structure's ->lock. Either way, line 40 returns the relevant grace-period number to the caller.

The rcu_accelerate_cbs( ) function 74 shown earlier in Pseudocode Listing 2 can now be modified as shown in Pseudocode Listing 13 to register future grace periods. The only change is the addition of line 20.

Pseudocode Listing 13 - rcu_accelerate_cbs( ) with future grace period recordation

```
1   static void rcu_accelerate_cbs(struct rcu_state *rsp,
2                                   struct rcu_node *rnp, struct rcu_data *rdp)
3   {
4     unsigned long c;
5     int i;
6
7     if (!rdp->nxttail[RCU_NEXT_TAIL] ||
       !*rdp->nxttail[RCU_DONE_TAIL])
8       return;
9     c = rcu_cbs_completed(rsp, rnp);
10    for (i = RCU_NEXT_TAIL - 1; i > RCU_DONE_TAIL; i--)
11      if (rdp->nxttail[i] != rdp->nxttail[i - 1] &&
12          !ULONG_CMP_GE(rdp->nxtcompleted[i], c))
13        break;
14    if (++i >= RCU_NEXT_TAIL)
15      return;
16    for (; i <= RCU_NEXT_TAIL; i++) {
17      rdp->nxttail[i] = rdp->nxttail[RCU_NEXT_TAIL];
18      rdp->nxtcompleted[i] = c;
19    }
20    rcu_start_future_gp(rnp, rdp);
21    if (!*rdp->nxttail[RCU_WAIT_TAIL])
22      trace_rcu_grace_period(rsp->name, rdp->gpnum,
          "AccWaitCB");
23    else
24      trace_rcu_grace_period(rsp->name, rdp->gpnum,
          "AccReadyCB");
25  }
```

The rcu_start_future_gp( ) function 94 can also be used to allow specially designated no-callbacks processors to initiate grace periods, as shown by the rcu_nocb_wait_gp( ) function 96 shown in FIG. 9. Example C-language pseudocode for the rcu_nocb_wait_gp( ) function 96 is shown in Pseudocode Listing 14.

Pseudocode Listing 14 - rcu_nocb_wait_gp( )

```
1   static void rcu_nocb_wait_gp(struct rcu_data *rdp)
2   {
3     unsigned long c;
4     bool d;
5     unsigned long flags;
6     struct rcu_node *rnp = rdp->mynode;
7
8     raw_spin_lock_irqsave(&rnp->lock, flags);
9     c = rcu_start_future_gp(rnp, rdp);
10    raw_spin_unlock_irqrestore(&rnp->lock, flags);
11    trace_rcu_future_gp(rnp, rdp, c, "StartWait");
12    for (;;) {
13      wait_event_interruptible(
14        rnp->nocb_gp_wq[c & 0x1],
15        (d = ULONG_CMP_GE(ACCESS_ONCE(rnp->completed),
          c)));
16      if (likely(d))
17        break;
18      flush_signals(current);
19      trace_rcu_future_gp(rnp, rdp, c, "ResumeWait");
20    }
21    trace_rcu_future_gp(rnp, rdp, c, "EndWait");
22    smp_mb( );
23  }
```

The rcu_nocb_wait_gp( ) function 96 invokes the rcu_start_future_gp( ) function 94 while holding the processor's leaf rcu_node structure's ->lock (as required) on lines 8-10. Line 11 then does event tracing. Each pass through the loop spanning lines 12-20 handles one wake-up event. Lines 13-15 block until either the grace-period number advances past that returned by rcu_start_future_gp( ) (on line 9) or until a signal is received. If line 16 sees that the grace-period number has advanced sufficiently, line 17 breaks out of the loop. Otherwise, line 18 flushes the signal and line 19 does event tracing. Once the loop is exited, execution resumes on line 21, which does yet more event tracing. Line 22 then executes a memory barrier to ensure that any post-grace-period callback invocations are seen by all processors as happening after the actual grace-period computation.

3.3 Grace Period Cleanup

In order to allow future grace period registration, it is necessary to clear out the need_future_gp[ ] array for each rcu_node structure 54 that previously requested the just-ended grace period. It is also necessary to wake up any no-callbacks kthreads waiting for this grace period to complete. These operations are handled by a function 98 that may be named "rcu_future_gp_cleanup( )" Example C-language pseudocode for the rcu_future_gp_cleanup( ) function 98 is shown in Pseudocode Listing 15. This function is called on each rcu_node structure 54 just after that rcu_node structure's ->completed field has been advanced, but while that rcu_node structure's ->lock is still held.

```
Pseudocode Listing 15 - rcu_future_gp_cleanup( )

1  static int rcu_future_gp_cleanup(struct rcu_state *rsp,
                                     struct rcu_node *rnp)
 2  {
 3     int c = rnp->completed;
 4     int needmore;
 5     struct rcu_data *rdp = this_cpu_ptr(rsp->rda);
 6
 7     rcu_nocb_gp_cleanup(rsp, rnp);
 8     rnp->need_future_gp[c & 0x1] = 0;
 9     needmore = rnp->need_future_gp[(c + 1) & 0x1];
10     trace_rcu_future_gp(rnp, rdp, c, needmore ? "CleanupMore" :
                                     "Cleanup");
11     return needmore;
12  }
```

Line 7 invokes a function called rcu_nocb_gp_cleanup( ) which, if the kernel is compiled with CONFIG_RCU_NOCB_CPU=y, does a wake_up( ) on ->nocb_gp_wq[c & 0x1], thus waking up all no-callbacks kthreads waiting for the end of the just-completed grace period on this rcu_node structure 54. Line 8 zeroes the corresponding element of the ->need_future[ ] array. Line 9 checks to see if there is a need registered on this rcu_node structure 54 for an additional grace period, line 10 does event tracing, and line 11 returns an indication to the caller as to whether another grace period is required.

4. Acceleration and Advancement Scenarios

This section displays a full set of scenarios for callback acceleration and advancement. These scenarios were generated automatically as part of a full-state-space testing effort. Table 1 below shows the complete list of callback-acceleration scenarios based on invocations of the rcu_accelerate_cb( ) function 74. Table 2 below shows the complete list of callback-advancement scenarios based on invocations of the rcu_advance_cbs( ) function 76.

TABLE 1

Callback Acceleration Scenarios

| Scenario | ->completed | Initial | Non-Root | Root |
|---|---|---|---|---|
| 0 | 0 | DW3R3N | | |
| 1 | 0 | DW2R2\|dN | D\|dW2R2N | D\|dW1R1N |
| 2 | 1 | DW2\|dR3N | D\|dW3R3N | (n/a) |
| 2 | 2 | DW2\|dR3N | | D\|dW3R3N |

TABLE 1-continued

Callback Acceleration Scenarios

| Scenario | ->completed | Initial | Non-Root | Root |
|---|---|---|---|---|
| 2 | 3 | DW2\|dR3N | | |
| 3 | 0 | DW1\|cR2\|dN | D\|c\|dW2R2N | (n/a) |
| 3 | 1 | DW1\|cR2\|dN | | D\|c\|dW2R2N |
| 3 | 2 | DW1\|cR2\|dN | | |
| 4 | 1 | D\|dW3R3N | | (n/a) |
| 4 | 2 | D\|dW3R3N | D\|dW3R4N | |
| 4 | 3 | D\|dW3R3N | D\|dW3R5N | D\|dW3R4N |
| 5 | 0 | D\|cW2R2\|dN | D\|cW2R2N | (n/a) |
| 5 | 1 | D\|cW2R2\|dN | D\|cW2\|dR3N | D\|c\|dW2R2N |
| 5 | 2 | D\|cW2R2\|dN | D\|cW2\|dR4N | D\|cW2\|dR3N |
| 6 | 0 | D\|cW2\|dR3N | D\|c\|dW2R2N | (n/a) |
| 6 | 1 | D\|cW2\|dR3N | | D\|c\|dW2R2N |
| 6 | 2 | D\|cW2\|dR3N | | |
| 6 | 3 | D\|cW2\|dR3N | | |
| 7 | -1 | D\|bW1\|cR2\|dN | D\|b\|c\|dW1R1N | (n/a) |
| 7 | 0 | D\|bW1\|cR2\|dN | D\|bW1\|c\|dR2N | D\|b\|c\|dW1R1N |
| 7 | 1 | D\|bW1\|cR2\|dN | | D\|bW1\|c\|dR2N |
| 7 | 2 | D\|bW1\|cR2\|dN | | |
| 8 | 0 | \|dDW3R3N | | |
| 9 | 0 | \|cDW2R2\|dN | \|cD\|dW2R2N | \|cD\|dW1R1N |
| 10 | 1 | \|cDW2\|dR3N | \|cD\|dW3R3N | (n/a) |
| 10 | 2 | \|cDW2\|dR3N | | \|cD\|dW3R3N |
| 10 | 3 | \|cDW2\|dR3N | | |
| 11 | 0 | \|bDW1\|cR2\|dN | \|bD\|c\|dW2R2N | (n/a) |
| 11 | 1 | bDW1\|cR2\|dN | | \|bD\|c\|dW2R2N |
| 11 | 2 | bDW1\|cR2\|dN | | |
| 12 | 1 | \|cDW2\|dR3N | | (n/a) |
| 12 | 2 | \|cDW2\|dR3N | \|cD\|dW3R4N | |
| 12 | 3 | \|cDW2\|dR3N | \|cD\|dW3R5N | \|cD\|dW3R4N |
| 13 | 0 | \|bD\|cW2R2\|dN | \|bD\|c\|dW2R2N | (n/a) |
| 13 | 1 | \|bD\|cW2R2\|dN | \|bD\|cW2\|dR3N | \|bD\|c\|dW2R2N |
| 13 | 2 | \|bD\|cW2R2\|dN | \|bD\|cW2\|dR4N | \|bD\|cW2\|dR3N |
| 14 | 0 | \|aD\|bW1\|cR2\|dN | \|bD\|c\|dW2R2N | (n/a) |
| 14 | 1 | \|aD\|bW1\|cR2\|dN | | \|bD\|c\|dW2R2N |
| 14 | 2 | \|aD\|bW1\|cR2\|dN | | |
| 14 | 3 | \|aD\|bW1\|cR2\|dN | | |
| 15 | -1 | \|aD\|bW1\|cR2\|dN | \|aD\|b\|c\|dW1R1N | (n/a) |
| 15 | 0 | \|aD\|bW1\|cR2\|dN | \|aD\|bW1\|c\|dR2N | \|aD\|b\|c\|dW1R1N |
| 15 | 1 | \|aD\|bW1\|cR2\|dN | | \|aD\|bW1\|c\|dR2N |
| 15 | 2 | \|aD\|bW1\|cR2\|dN | | |

Figure 15:
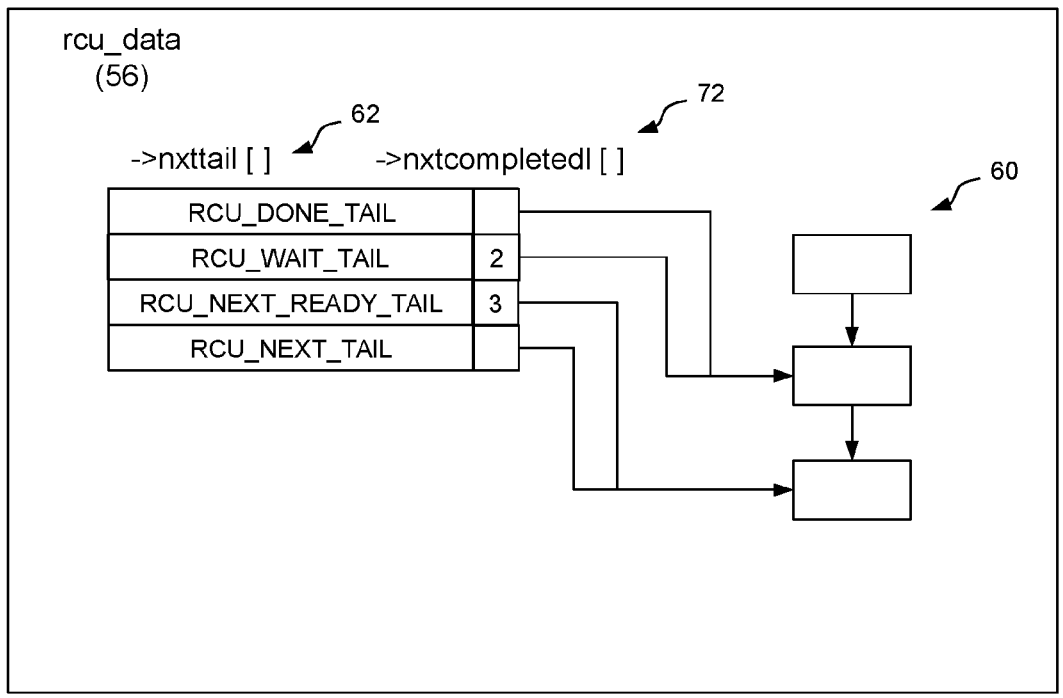
FIG. 15 is a functional block diagram showing the example rcu_data structure of FIG. 10, with the sublist tail pointers in another state.

With reference to Table 1 above, it will be recalled that callback acceleration using the rcu_accelerate_cbs_( ) function 74 assigns completed numbers to callbacks that are not yet ready to invoke (where possible), but does not attempt to move callbacks to the RCU_DONE_TAIL sublist. The first column ("Scenario") gives the scenario identifier, in which each bit indicates the presence or absence of callbacks in the corresponding segment of the callback list. Thus scenario 10 (0xa or 0b1010) specifies callbacks in the RCU_DONE_TAIL and RCU_NEXT_READY_TAIL portions of the list. This is depicted graphically in FIG. 15.

The second column ("->completed") indicates the value of rnp->completed, which is identical to the initial value of rnp->gpnum. In other words, Table 1 is showing results for an idle RCU state. Non-idle RCU gives the same results for non-root scenarios, and for root scenarios gives the same result as for idle non-root scenarios.

The third column ("Initial") depicts the initial state of the callback list 60 (before the call to the rcu_accelerate_cbs( ) function 74). The letters "D", "W", "R", and "N" denote the tails of the RCU_DONE_TAIL, RCU_WAIT_TAIL, RCU_NEXT_READY_TAIL, and RCU_NEXT_TAIL sublists, respectively. The letters "W" and "R" are followed by a numeral that indicates the value of the corresponding element of the ->nxtcompleted[ ] array 72. The letters "D" and "N" do not need a numeral. For the corresponding sublists, the ->nxtcompleted[ ] entry is irrelevant. As previously explained, the callbacks in the RCU_DONE_TAIL sublist are ready to invoke, so their ->completed value has already passed, and the callbacks in the RCU_NEXT_TAIL sublist have not yet been assigned a ->completed value. A vertical bar followed by one of the lower-case letters "a" through "d" denotes a non-empty sequence of callbacks. Because "N" marks the end of the entire list, there cannot be callbacks following it. Cells that are empty represent scenarios where the call to the rcu_accelerate_cbs( ) function 74 was a no-op. Cells marked with "(n/a)" represent scenarios that did not need to be tested due to being analogous to the next scenario. For example, Scenario 2 with ->completed of 1 for the root rcu_node structure 54 would accelerate all the callbacks to the RCU_WAIT_TAIL sublist to be ready to invoke at the end of the next grace period, just as with the following row (Scenario 2 with ->completed of 2 for the root rcu_node structure). The fourth column ("Non-Root") shows the result of callback advancement from a call to the rcu_accelerate_cbs( ) function 74 where the rcu_node structure 54 is not the root of the rcu_node tree, while, the fifth column ("Root") shows the analogous result where the rcu_node structure is the root of the rcu_node tree.

It is noted that the only scenarios where the rcu_accelerate_cbs( ) function 74 leaves "holes" (empty RCU_WAIT_TAIL sublist with non-empty RCU_NEXT_READY sublist) are scenarios where the initial list also had such a hole. These are Scenarios 2, 3, 10, and 11.

Table 2 below has a similar format, but instead shows callback-advancement scenarios based on calls to the rcu_advance_cbs( ) function 76. Here, all callbacks that are not ready to invoke are marked with their ->completed number, but any callbacks that are now ready to invoke are also moved to the RCU_DONE_TAIL sublist. It should be noted that the rcu_advance_cbs( ) function 76 never leaves "holes" in the callback list 60, even if there was a hole to start with. Because the callback sublists are initially empty (which means no hole), and because neither the rcu_accelerate_cbs( ) function 74 nor the rcu_advance_cbs( ) function generate new holes, the callback list 60 will never have holes.

TABLE 2

Callback Advancement Scenarios

| Scenario | -> completed | Initial | Non-Root | Root |
|---|---|---|---|---|
| 0 | 0 | DW3R3N | | |
| 1 | 0 | DW2R2\|dN | D\|dW2R2N | D\|dW1R1N |
| 2 | 1 | DW2\|dR3N | D\|dW3R3N | (n/a) |
| 2 | 2 | DW2\|dR3N | D\|dW3R4N | D\|dW3R3N |
| 2 | 3 | DW2\|dR3N | \|dDW2R3N | \|dDW2R3N |
| 3 | 0 | DW1\|cR2\|dN | D\|c\|dW2R2N | (n/a) |
| 3 | 1 | DW1\|cR2\|dN | D\|cW2\|dR3N | D\|c\|dW2R2N |
| 3 | 2 | DW1\|cR2\|dN | \|cD\|dW4R4N | \|cD\|dW3R3N |
| 4 | 1 | D\|dW3R3N | | (n/a) |
| 4 | 2 | D\|dW3R3N | D\|dW3R4N | |
| 4 | 3 | D\|dW3R3N | \|dDW3R3N | \|dDW3R3N |
| 5 | 0 | D\|cW2R2\|dN | D\|c\|dW2R2N | (n/a) |
| 5 | 1 | D\|cW2R2\|dN | D\|cW2\|dR3N | D\|c\|dW2R2N |
| 5 | 2 | D\|cW2R2\|dN | \|cD\|dW4R4N | \|cD\|dW3R3N |
| 6 | 0 | D\|cW2\|dR3N | D\|c\|dW2R2N | (n/a) |
| 6 | 1 | D\|cW2\|dR3N | | D\|c\|dW2R2N |
| 6 | 2 | D\|cW2\|dR3N | \|cD\|dW3R4N | \|cD\|dW2R2N |
| 6 | 3 | D\|cW2\|dR3N | \|c\|dDW2R4N | \|c\|dDW2R3N |
| 7 | -1 | D\|bW1\|cR2\|dN | D\|b\|c\|dW1R1N | (n/a) |
| 7 | 0 | D\|bW1\|cR2\|dN | D\|bW1\|c\|dR2N | D\|b\|c\|dW1R1N |
| 7 | 1 | D\|bW1\|cR2\|dN | \|bD\|cW2\|dR3N | \|bD\|c\|dW2R2N |
| 7 | 2 | D\|bW1\|cR2\|dN | \|b\|cD\|dW4R4N | \|b\|cD\|dW3R3N |
| 8 | 0 | \|dDW3R3N | | |
| 9 | 0 | \|cDW2R2\|dN | \|cD\|dW2R2N | \|cD\|dW1R1N |
| 10 | 1 | \|cDW2\|dR3N | \|cD\|dW3R3N | (n/a) |
| 10 | 2 | \|cDW2\|dR3N | \|cD\|dW3R4N | \|cD\|dW3R3N |
| 10 | 3 | \|cDW2\|dR3N | \|c\|dDW2R3N | \|c\|dDW2R3N |
| 11 | 0 | \|bDW1\|cR2\|dN | \|bD\|c\|dW2R2N | (n/a) |
| 11 | 1 | bDW1\|cR2\|dN | \|bD\|cW2\|dR3N | \|bD\|c\|dW2R2N |
| 11 | 2 | bDW1\|cR2\|dN | \|b\|cD\|dW4R4N | \|b\|cD\|dW3R3N |
| 12 | 1 | \|cDW2\|dR3N | | (n/a) |
| 12 | 2 | \|cDW2\|dR3N | \|cD\|dW3R4N | |
| 12 | 3 | \|cDW2\|dR3N | \|c\|dDW3R3N | \|c\|dDW3R3N |
| 13 | 0 | \|bD\|cW2R2\|dN | \|bD\|c\|dW2R2N | (n/a) |
| 13 | 1 | \|bD\|cW2R2\|dN | \|bD\|cW2\|dR3N | \|bD\|c\|dW2R2N |
| 13 | 2 | \|bD\|cW2R2\|dN | \|b\|cD\|dW4R4N | \|b\|cD\|dW3R3N |
| 14 | 0 | \|aD\|bW1\|cR2\|dN | \|bD\|c\|dW2R2N | (n/a) |
| 14 | 1 | \|aD\|bW1\|cR2\|dN | | \|bD\|c\|dW2R2N |
| 14 | 2 | \|aD\|bW1\|cR2\|dN | \|b\|cD\|dW3R4N | \|b\|cD\|dW3R3N |
| 14 | 3 | \|aD\|bW1\|cR2\|dN | \|b\|c\|dDW2R3N | \|b\|c\|dDW2R3N |
| 15 | -1 | \|aD\|bW1\|cR2\|dN | \|aD\|b\|c\|dW1R1N | (n/a) |
| 15 | 0 | \|aD\|bW1\|c\|dR2N | \|aD\|bW1\|c\|dR2N | aD\|b\|c\|dW1R1N |
| 15 | 1 | \|aD\|bW1\|cR\|dN | \|a\|bD\|cW2\|dR3N | \|a\|bD\|c\|dW2R2N |
| 15 | 2 | \|aD\|bW1\|cR2\|dN | \|a\|b\|cD\|dW4R4N | \|a\|b\|cD\|dW3R3N |

Figure 16:
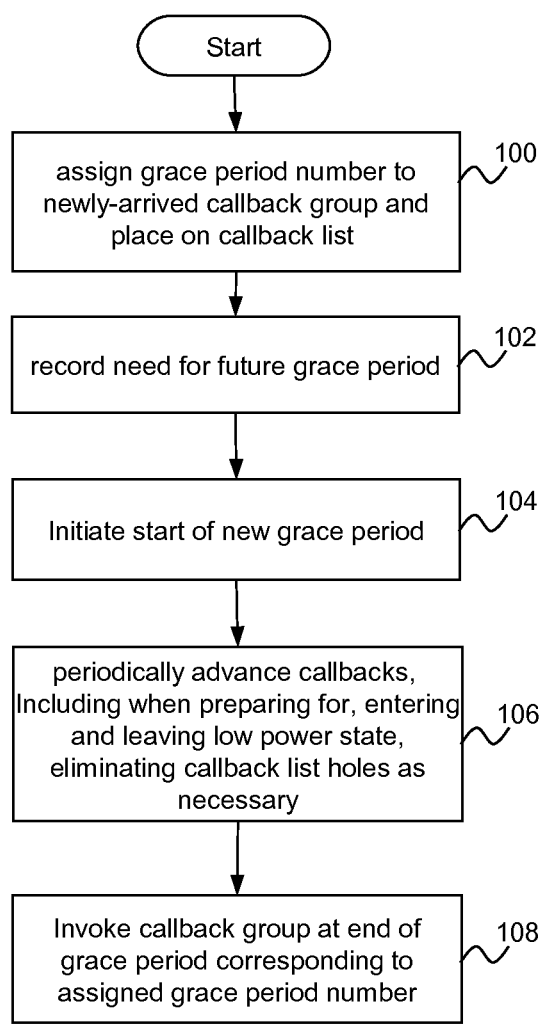
FIG. 16 is a flow diagram showing example operations of the RCU subsystem disclosed herein.

Turning now to FIG. 16, a flow diagram illustrates salient features of the operations discussed in connection with FIGS. 5-15 and Pseudocode Listings 1-15. In block 100, RCU callbacks that are newly-arrived at a processor 4 are assigned a grace period number and placed on the processor's callback list 60, as per the rcu_accelerate_cbs( ) function 74. In block 102, the need for a future grace period is recorded in the processor's rnp_node structure 54, as per the rcu_start_future_gp( ) function 94. In block 104, a new grace period is initiated, as per the rcu_start_gp_advanced( ) function 90. In block 106, callbacks are periodically advanced or accelerated, as per the rcu_advance_cbs( ) function 76, including when preparing to enter (advance), enter (accelerate) and leave (advance) a dynticks-idle state, as per the rcu_needs_cpu( ) function 80, the rcu_prepare_for_idle( ) function 82, and the rcu_cleanup_after_idle( ) function 84. In block 108, a callback group on the callback list 60 of a processor 4 is invoked at the end of the grace period corresponding to the group's assigned grace period number.

Accordingly, an RCU technique has been disclosed for achieving low grace-period latencies in an energy efficient environment in which processors with RCU callbacks are allowed to enter low power states. It will be appreciated that the foregoing concepts may be variously embodied in any of a data processing system, a machine implemented method, and a computer program product in which programming logic is provided by one or more machine-readable non-transitory data storage media for use in controlling a data processing system to perform the required functions. Example embodiments of a data processing system and machine implemented method were previously described in connection with FIG. 4-16. With respect to a computer program product, digitally encoded program instructions may be stored on one or more computer-readable non-transitory data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a processor, the program instructions combine with the processor to provide a particular machine that operates analogously to specific logic circuits, which themselves could be used to implement the disclosed subject matter.

Figure 17:
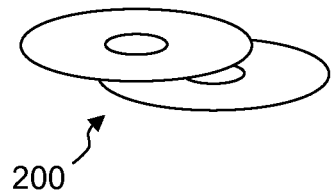
FIG. 17 is a diagrammatic illustration showing example computer-readable non-transitory data storage media that may be used to provide a computer program product in accordance with the present disclosure.

Example computer-readable non-transitory data storage media for storing such program instructions are shown by reference numerals 8 (memory) and 10 (cache) of the computer system 2 of FIG. 4. The system 2 may further include one or more secondary (or tertiary) storage devices (not shown) that could store the program instructions between system reboots. A further example of computer-readable non-transitory data storage media that may be used to store the program instructions is shown by reference numeral 200 in FIG. 17. The data storage media 200 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such data storage media can store the program instructions either alone or in conjunction with an operating system or other software product that incorporates the required functionality. The computer-readable non-transitory data storage media could also be provided by other portable data storage media (such as floppy disks, flash memory sticks, etc.), or data storage media combined with drive systems (e.g. disk drives). As is the case with the memory 8 and the cache 10 of FIG. 4, the computer-readable non-transitory data storage media may be incorporated in data processing platforms that have integrated random access memory (RAM), read-only memory (ROM) or other semiconductor or solid state memory, all of which represent further examples of computer-readable non-transitory data storage media. More broadly, the computer-readable non-transitory data storage media could comprise any electronic, magnetic, optical, infrared, semiconductor system or apparatus or device, or any other tangible non-transitory entity representing a machine, manufacture or composition of matter that can contain, store, communicate, or transport the program instructions for use by or in connection with an instruction execution system, apparatus or device, such as a computer. For all of the above forms of computer-readable non-transitory data storage media, when the program instructions are loaded into and executed by an instruction execution system, apparatus or device, the resultant programmed system, apparatus or device becomes a particular machine for practicing embodiments of the method(s) and system(s) described herein.

Although various example embodiments have been shown and described, it should be apparent that many variations and alternative embodiments could be implemented in accordance with the disclosure. It is understood, therefore, that the invention is not to be in any way limited except in accordance with the spirit of the appended claims and their equivalents.

What is claimed is:

1. In a computer system having one or more processors operatively coupled to one or more memory devices, a method for achieving low grace-period latencies in an energy efficient environment in which processors with Read-Copy Update (RCU) callbacks are allowed to enter low power states, comprising:
   periodically generating RCU callbacks as part of shared data element update Operations, said callbacks representing requests for deferred destruction of shared data elements following an RCU grace period;
   maintaining said RCU callbacks on a per-processor basis:
   for each of said one or more processors that maintains RCU callbacks, assigning different RCU grace period numbers to different groups of said processor's RCU callbacks;
   periodically starting new RCU grace periods and ending old RCU grace periods; and
   as said old RCU grace periods end, invoking said groups of RCU callbacks having corresponding assigned RCU grace period numbers.

2. The method of claim 1, wherein said groups of RCU callbacks are maintained on sublists of RCU callback lists associated with said one or more processors, and wherein said grace period number assigning comprises a callback accelerate operation wherein said RCU grace period numbers are assigned to newly arrived groups of RCU callbacks, and wherein said newly arrived groups of RCU callbacks are placed on selected sublists according to said assigned RCU grace period numbers.

3. The method of claim 2, wherein said RCU callback lists include a done-sublist for RCU callbacks that are ready to be invoked, and wherein said method further includes performing a callback advance operation for each of said one or more processors that is not offline or designated as a no-callbacks processor, and having RCU callbacks that are waiting for a not-yet-completed RCU grace period, said callback advance operation including advancing to said done-sublist any of said groups of RCU callbacks whose assigned RCU grace period numbers correspond to RCU grace periods that have ended, said callback advance operation further including performing said callback accelerate operation.

4. The method of claim 3, wherein said RCU callback lists each comprise plural sublists, and wherein said callback advance operation further includes adjusting sublists other than said done-sublist to maintain said RCU callback lists in a consistent state without holes therein.

5. The method of claim 3, wherein said callback advance operation is attempted as said one or more processors prepare for entry into a low power state, said callback accelerate operation is attempted on entry into said low power state, and said callback advance operation is attempted again on exit from said low power state.

6. The method of claim 1, wherein said grace period number assigning includes recording future RCU grace periods needed by said one or more processors so that said future RCU grace periods can be initiated without waking said one or more processors if they are in a low power state.

7. The method of claim 6, further including using said future grace period recording to offload callback invocation from specially designated ones of said one or more processors.

8. A multiprocessor system, comprising:
   two or more processors;
   a memory coupled to said processors, said memory including a computer useable medium tangibly embodying at least one program of instructions executable by said processors to implement a read-copy update (RCU) subsystem and to perform operations for achieving low grace-period latencies in an energy efficient environment in which processors with Read-Copy Update (RCU) callbacks are allowed to enter low power states, said operations comprising:
   periodically generating RCU callbacks as part of shared data element update Operations, said callbacks representing requests for deferred destruction of shared data elements following an RCU grace period;

maintaining said RCU callbacks on a per-processor basis;
for each of said one or more processors that maintains said RCU callbacks, assigning different RCU grace period numbers to different groups of said processor's RCU callbacks;
periodically starting new RCU grace periods and ending old RCU grace periods; and
as said old RCU grace periods end, invoking said groups of RCU callbacks having corresponding assigned RCU grace period numbers.

9. The system of claim 8, wherein said groups of RCU callbacks are maintained on sublists of RCU callback lists associated with said one or more processors, and wherein said grace period number assigning comprises a callback accelerate operation wherein said RCU grace period numbers are assigned to newly arrived groups of RCU callbacks, and wherein said newly arrived groups of RCU callbacks are placed on selected sublists according to said assigned RCU grace period numbers.

10. The system of claim 9, wherein said RCU callback lists include a done-sublist for RCU callbacks that are ready to be invoked, and wherein said method further includes performing a callback advance operation for each of said one or more processors that is not offline or designated as a no-callbacks processor, and having RCU callbacks that are waiting for a not-yet-completed RCU grace period, said callback advance operation including advancing to said done-sublist any of said groups of RCU callbacks whose assigned RCU grace period numbers correspond to RCU grace periods that have ended, said callback advance operation further including performing said callback accelerate operation.

11. The system of claim 10, wherein said RCU callback lists each comprise plural sublists, and wherein said callback advance operation further includes adjusting sublists other than said done-sublist to maintain said RCU callback lists in a consistent state without holes therein.

12. The system of claim 10, wherein said callback advance operation is attempted as said one or more processors prepare for entry into a low power state, said callback accelerate operation is attempted on entry into said low power state, and said callback advance operation is attempted again on exit from said low power state.

13. The system of claim 8, wherein said grace period number assigning includes recording future RCU grace periods needed by said one or more processors so that said future RCU grace periods can be initiated without waking said one or more processors if they are in a low power state.

14. The system of claim 13, wherein said operations further include using said future grace period recording to offload callback invocation from specially designated ones of said one or more processors.

15. A computer program product, comprising:
one or more machine-readable non-transitory data storage media;
program instructions provided by said one or more data storage media for programming a multiprocessor data processing platform to implement a read-copy update (RCU) subsystem and to perform operations for achieving low grace-period latencies in an energy efficient environment in which processors with Read-Copy Update (RCU) callbacks are allowed to enter low power states, said operations comprising:
periodically generating RCU callbacks as part of shared data element update Operations, said callbacks representing requests for deferred destruction of shared data elements following an RCU grace period;
maintaining said RCU callbacks on a per-processor basis;
for each of said one or more processors that maintains said RCU callbacks, assigning different RCU grace period numbers to different groups of said processor's RCU callbacks;
periodically starting new RCU grace periods and ending old RCU grace periods; and
as said old RCU grace periods end, invoking said groups of RCU callbacks having corresponding assigned RCU grace period numbers.

16. The computer program product of claim 15, wherein said groups of RCU callbacks are maintained on sublists of RCU callback lists associated with said one or more processors, and wherein said grace period number assigning comprises a callback accelerate operation wherein said RCU grace period numbers are assigned to newly arrived groups of RCU callbacks, and wherein said newly arrived groups of RCU callbacks are placed on selected sublists according to said assigned RCU grace period numbers.

17. The computer program product of claim 16, wherein said RCU callback lists include a done-sublist for RCU callbacks that are ready to be invoked, and wherein said method further includes performing a callback advance operation for each of said one or more processors that is not offline or designated as a no-callbacks processor, and having RCU callbacks that are waiting for a not-yet-completed RCU grace period, said callback advance operation including advancing to said done-sublist any of said groups of RCU callbacks whose assigned grace period numbers correspond to RCU grace periods that have ended, said callback advance operation further including performing said callback accelerate operation.

18. The computer program product of claim 17, wherein said callback advance operation is attempted as said one or more processors prepare for entry into a low power state, said callback accelerate operation is attempted on entry into said low power state, and said callback advance operation is attempted again on exit from said low power state.

19. The computer program product of claim 15, wherein said grace period number assigning includes recording future RCU grace periods needed by said one or more processors so that said future RCU grace periods can be initiated without waking said one or more processors if they are in a low power state.

20. The computer program product of claim 19, wherein said operations further include using said future grace period recording to offload callback invocation from specially designated ones of said one or more processors.

* * * * *